United States Patent
Abraham et al.

(10) Patent No.: US 9,215,732 B2
(45) Date of Patent: Dec. 15, 2015

(54) SYSTEMS AND METHODS FOR COLLISION MANAGEMENT IN A NEIGHBORHOOD AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 107 days.

(21) Appl. No.: 14/231,226

(22) Filed: Mar. 31, 2014

(65) Prior Publication Data

US 2014/0301190 A1 Oct. 9, 2014

Related U.S. Application Data

(60) Provisional application No. 61/808,052, filed on Apr. 3, 2013, provisional application No. 61/824,926, filed on May 17, 2013, provisional application No. 61/828,529, filed on May 29, 2013.

(51) Int. Cl.
*H04W 74/08* (2009.01)
*H04W 28/04* (2009.01)

(52) U.S. Cl.
CPC ........ *H04W 74/0816* (2013.01); *H04W 28/044* (2013.01); *H04W 74/0808* (2013.01)

(58) Field of Classification Search
CPC .......... H04W 74/0816; H04W 28/044; H04W 74/0808
See application file for complete search history.

(56) References Cited

U.S. PATENT DOCUMENTS

| | | | |
|---|---|---|---|
| 2004/0071154 A1 | 4/2004 | Wentink | |
| 2007/0201377 A1 | 8/2007 | Santhanam et al. | |
| 2008/0101308 A1 | 5/2008 | Gaur | |
| 2009/0279427 A1* | 11/2009 | Ji | H04W 74/0816 370/230 |
| 2010/0034177 A1 | 2/2010 | Santhanam | |
| 2010/0098048 A1* | 4/2010 | Kang | H04L 12/413 370/345 |
| 2010/0195664 A1* | 8/2010 | Ho | H04L 12/413 370/445 |

(Continued)

OTHER PUBLICATIONS

International Search Report and Written Opinion—PCT/US2014/032551—ISA/EPO—Jul. 29, 2014.

*Primary Examiner* — Brian D Nguyen
(74) *Attorney, Agent, or Firm* — Knobbe, Martens, Olson & Bear LLP

(57) ABSTRACT

Methods, devices, and computer program products for collision management of wireless devices in a peer-to-peer network are described herein. In one aspect, a method of communicating via a wireless medium by a wireless communications apparatus within a network is provided. The method includes determining first and second contention windows. The first contention window begins earlier than the second contention window. The method further includes beginning a first carrier sense multiple access (CSMA) countdown at the start of the first contention window. The method further includes beginning a second CSMA countdown when the first CSMA countdown does not end before the start of the second contention window. The method further includes transmitting the prepared frame at a time of the first CSMA countdown ending or the second CSMA countdown ending, whichever is earlier.

56 Claims, 16 Drawing Sheets

(56) References Cited

U.S. PATENT DOCUMENTS

| | | |
|---|---|---|
| 2011/0128849 A1 | 6/2011 | Guo |
| 2012/0163218 A1* | 6/2012 | Kim ..................... H04W 74/08 370/252 |
| 2013/0100941 A1* | 4/2013 | Lampin ............. H04W 72/0446 370/336 |
| 2013/0121151 A1* | 5/2013 | Nguyen ............... H04L 12/6418 370/235 |
| 2013/0155955 A1* | 6/2013 | Nabetani ........... H04W 74/0816 370/328 |

* cited by examiner

SYSTEMS AND METHODS FOR COLLISION MANAGEMENT IN A NEIGHBORHOOD AWARE NETWORK

CROSS-REFERENCE TO RELATED APPLICATIONS

This application claims the benefit of U.S. Provisional Application Nos. 61/808,052, filed Apr. 3, 2013; 61/824,926, filed May 17, 2013; and 61/828,529, filed May 29, 2013, the entire contents of each of which is incorporated herein by reference.

FIELD

The present application relates generally to wireless communications, and more specifically to systems, methods, and devices for collision management in a peer-to-peer wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

When there are multiple users of a wireless network, to avoid collisions and loss of data, the network may provide a procedure for coordinating access to the wireless medium. As the number of users of the wireless network rises, the chance of collisions even with coordination may further rise. Improved methods and systems for reducing loss of data in a network with a large number of users are desirable.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of communicating via a wireless medium by a wireless communications apparatus within a network. The method includes determining first and second contention windows. The first contention window begins earlier than the second contention window. The method further includes beginning a first carrier sense multiple access (CSMA) countdown at the start of the first contention window. The method further includes beginning a second CSMA countdown when the first CSMA countdown does not end before the start of the second contention window. The method further includes transmitting the prepared frame at a time of the first CSMA countdown ending or the second CSMA countdown ending, whichever is earlier.

In an embodiment, the method can further include determining a random start time, within a discovery window, for the second contention window. In an embodiment, the method can further include transmitting the prepared frame when the first CSMA countdown ends before the start of the second contention window. In an embodiment, the method can further include determining a first random backoff count less than a size of the first contention window. The method can further include determining a second random backoff count less than a size of second contention window.

In an embodiment, the first contention window can be larger than the second contention window. In an embodiment, a size of the first contention window, in slots, can be a least five times a number of devices in the network. In an embodiment, a size of the second contention window can be 15 slots. In an embodiment, a size of the second contention window can be 31 slots.

In an embodiment, the network can further include a neighborhood-aware-network. In an embodiment, the prepared frame can further include a discovery frame.

Another aspect of the subject matter described in the disclosure provides a wireless communications apparatus configured to communicate within a network via a wireless medium. The apparatus includes a processor configured to determine first and second contention windows. The first contention window begins earlier than the second contention window. The processor is further configured to begin a first carrier sense multiple access (CSMA) countdown at the start of the first contention window. The processor is further configured to begin a second CSMA countdown when the first CSMA countdown does not end before the start of the second contention window. The apparatus further includes a transmitter configured to transmit the prepared frame at a time of the first CSMA countdown ending or the second CSMA countdown ending, whichever is earlier.

In an embodiment, the processor can be further configured to determine a random start time, within a discovery window, for the second contention window. In an embodiment, the transmitter can be further configured to transmit the prepared frame when the first CSMA countdown ends before the start of the second contention window. In an embodiment, the processor can be further configured to determine a first random backoff count less than a size of the first contention window. The processor is further configured to determine a second random backoff count less than a size of second contention window.

In an embodiment, the first contention window can be larger than the second contention window. In an embodiment, a size of the first contention window, in slots, can be a least five times a number of devices in the network. In an embodiment, a size of the second contention window can be 15 slots. In an embodiment, a size of the second contention window can be 31 slots.

In an embodiment, the network can further include a neighborhood-aware-network. In an embodiment, the prepared frame can further include a discovery frame.

Another aspect of the subject matter described in the disclosure provides an apparatus for communicating within a network via a wireless medium. The apparatus includes means for determining first and second contention windows. The first contention window begins earlier than the second contention window. The apparatus further includes means for beginning a first carrier sense multiple access (CSMA) countdown at the start of the first contention window. The apparatus further includes means for beginning a second CSMA countdown when the first CSMA countdown does not end before the start of the second contention window. The apparatus further includes means for transmitting the prepared frame at a time of the first CSMA countdown ending or the second CSMA countdown ending, whichever is earlier.

In an embodiment, the apparatus can further include means for determining a random start time, within a discovery window, for the second contention window. In an embodiment, the apparatus can further include means for transmitting the prepared frame when the first CSMA countdown ends before the start of the second contention window. In an embodiment, the apparatus can further include means for determining a first random backoff count less than a size of the first contention window. The apparatus can further include means for determining a second random backoff count less than a size of second contention window.

In an embodiment, the first contention window can be larger than the second contention window. In an embodiment, a size of the first contention window, in slots, can be a least five times a number of devices in the network. In an embodiment, a size of the second contention window can be 15 slots. In an embodiment, a size of the second contention window can be 31 slots.

In an embodiment, the network can further include a neighborhood-aware-network. In an embodiment, the prepared frame can further include a discovery frame.

Another aspect of the subject matter described in the disclosure provides a non-transitory computer-readable medium including code that, when executed, causes a wireless communications apparatus within a network to determine first and second contention windows. The first contention window begins earlier than the second contention window. The medium further includes code that, when executed, causes the apparatus to begin a first carrier sense multiple access (CSMA) countdown at the start of the first contention window. The medium further includes code that, when executed, causes the apparatus to begin a second CSMA countdown when the first CSMA countdown does not end before the start of the second contention window. The medium further includes code that, when executed, causes the apparatus to transmit the prepared frame at a time of the first CSMA countdown ending or the second CSMA countdown ending, whichever is earlier.

In an embodiment, the medium can further include code that, when executed, causes the apparatus to determine a random start time, within a discovery window, for the second contention window. In an embodiment, the medium can further include code that, when executed, causes the apparatus to transmit the prepared frame when the first CSMA countdown ends before the start of the second contention window. In an embodiment, the medium can further include code that, when executed, causes the apparatus to determine a first random backoff count less than a size of the first contention window. The medium can further include code that, when executed, causes the apparatus to determine a second random backoff count less than a size of second contention window.

In an embodiment, the first contention window can be larger than the second contention window. In an embodiment, a size of the first contention window, in slots, can be a least five times a number of devices in the network. In an embodiment, a size of the second contention window can be 15 slots. In an embodiment, a size of the second contention window can be 31 slots.

In an embodiment, the network can further include a neighborhood-aware-network. In an embodiment, the prepared frame can further include a discovery frame.

Another aspect provides a method of communicating via a wireless medium by a wireless communications apparatus within a neighborhood aware network. The network is configured with periodic discovery windows, and sized for a maximum number of devices M. The method includes determining a discovery window interval K, the smallest integer greater than or equal to one, such that the probability that more than a threshold M devices will transmit during the same discovery window is less than a threshold probability P. The method further includes selecting a random or pseudo-random integer m in the range from 0 to K−1. The method further includes deferring for at least m discovery windows after a previous interval K−1 has elapsed. The method further includes transmitting a discovery frame during the next discovery window after said deferring.

Another aspect provides a device configured to communicate via a wireless medium by a wireless communications apparatus within a neighborhood aware network. The network is configured with periodic discovery windows, and sized for a maximum number of devices M. The device includes a processor configured to determine a discovery window interval K, the smallest integer greater than or equal to one, such that the probability that more than a threshold M devices will transmit during the same discovery window is less than a threshold probability P. The processor is further configured to select a random or pseudo-random integer m in the range from 0 to K−1. The processor is further configured to defer for at least m discovery windows after a previous interval K−1 has elapsed. The device further includes a transmitter configured to transmit a discovery frame during the next discovery window after said deferring.

Another aspect provides an apparatus for communicating via a wireless medium by a wireless communications apparatus within a neighborhood aware network. The network is configured with periodic discovery windows, and sized for a maximum number of devices M. The apparatus includes means for determining a discovery window interval K, the smallest integer greater than or equal to one, such that the probability that more than a threshold M devices will transmit during the same discovery window is less than a threshold probability P. The apparatus further includes means for selecting a random or pseudo-random integer m in the range from 0 to K−1. The apparatus further includes means for deferring for at least m discovery windows after a previous interval K−1 has elapsed. The apparatus further includes means for transmitting a discovery frame during the next discovery window after said deferring.

Another aspect provides a non-transitory computer-readable medium including code that, when executed, causes an apparatus to determine a discovery window interval K, the smallest integer greater than or equal to one, such that the probability that more than a threshold M devices will transmit during the same discovery window is less than a threshold probability P. The medium further includes code that, when executed, causes the apparatus to select a random or pseudorandom integer m in the range from 0 to K−1. The medium further includes code that, when executed, causes the apparatus to defer for at least m discovery windows after a previous interval K−1 has elapsed. The medium further includes code that, when executed, causes the apparatus to transmit a discovery frame during the next discovery window after said deferring.

Another aspect provides a method of communicating via a wireless medium by a wireless communications apparatus within a neighborhood aware network, configured with periodic discovery windows. The method includes determining a discovery window interval K, based on a discovery window utilization. The method further includes selecting a random or pseudo-random integer m in the range from 0 to K−1. The method further includes deferring for at least m discovery windows after a previous interval K−1 has elapsed. The method further includes transmitting a discovery frame during the next discovery window after said deferring.

In various embodiments, deferring can include determining an adjustment $b=\max(0, (K-m_{-1}-c))$, and deferring for $b+m$ discovery windows. $m_{-1}$ can include an integer m computed for a previous transmission, and c can include a number of discovery windows that have elapsed since the previous transmission.

In various embodiments, determining the discovery window interval K can include determining a transmission end time for a discovery window, comparing the transmission end time to a threshold time smaller than a size of the discovery window, increasing K when the transmission end time is greater than or equal to the threshold time, and decreasing K when the transmission end time is less than the threshold time. Increasing K can include setting K to the minimum of: a maximum K, and a previous K plus a constant. Increasing K can include setting K to the minimum of: a maximum K, and a previous K times a constant greater than one. Decreasing K can include setting K to the maximum of: a minimum K, and a previous K minus a constant. Decreasing K can include setting K to the maximum of: a minimum K, and a previous K times a constant less than one.

Another aspect provides a device configured to communicate via a wireless medium, within a neighborhood aware network configured with periodic discovery windows. The device includes a processor configured to determine a discovery window interval K, based on a discovery window utilization. The processor is further configured to select a random or pseudo-random integer m in the range from 0 to K−1. The processor is further configured to defer for at least m discovery windows after a previous interval K−1 has elapsed. The device further includes a transmitter configured to transmit a discovery frame during the next discovery window after said deferring.

In various embodiments, the processor can be further configured to determine an adjustment $b=\max(0, (K-m_{-1}-c))$, and defer for $b+m$ discovery windows. $m_{-1}$ can include an integer m computed for a previous transmission, and c can include a number of discovery windows that have elapsed since the previous transmission.

In various embodiments, the processor can be further configured to determine a transmission end time for a discovery window, compare the transmission end time to a threshold time smaller than a size of the discovery window, increase K when the transmission end time is greater than or equal to the threshold time, and decrease K when the transmission end time is less than the threshold time. In various embodiments, the processor can be further configured to increase K by setting. In various embodiments, the processor can be further configured to increase K by setting K to the minimum of: a maximum K, and a previous K times a constant greater than one. In various embodiments, the processor can be further configured to decrease K by setting K to the maximum of: a minimum K, and a previous K minus a constant. In various embodiments, the processor can be further configured to decrease K by setting K to the maximum of: a minimum K, and a previous K times a constant less than one.

Another aspect provides an apparatus for communicating via a wireless medium, within a neighborhood aware network configured with periodic discovery windows. The apparatus includes means for determining a discovery window interval K, based on a discovery window utilization. The apparatus further includes means for selecting a random or pseudo-random integer m in the range from 0 to K−1. The apparatus further includes means for deferring for at least m discovery windows after a previous interval K−1 has elapsed. The apparatus further includes means for transmitting a discovery frame during the next discovery window after said deferring.

In various embodiments, said means for deferring can include means for determining an adjustment $b=\max(0, (K-m_{-1}-c))$, and means for deferring for $b+m$ discovery windows. m−1 can include an integer m computed for a previous transmission, and c can include a number of discovery windows that have elapsed since the previous transmission In various embodiments, means for determining the discovery window interval K can include means for determining a transmission end time for a discovery window, means for comparing the transmission end time to a threshold time smaller than a size of the discovery window, means for increasing K when the transmission end time is greater than or equal to the threshold time, and means for decreasing K when the transmission end time is less than the threshold time. Means for increasing K can include means for setting K to the minimum of: a maximum K, and a previous K plus a constant. Means for increasing K can include means for setting K to the minimum of: a maximum K, and a previous K times a constant greater than one. Means for decreasing K can include means for setting K to the maximum of: a minimum K, and a previous K minus a constant. Means for decreasing K can include means for setting K to the maximum of: a minimum K, and a previous K times a constant less than one.

Another aspect provides a non-transitory computer-readable medium including code that, when executed, causes an apparatus to determine a discovery window interval K, based on a discovery window utilization, select a random or pseudo-random integer m in the range from 0 to K−1, defer for at least m discovery windows after a previous interval K−1 has elapsed, and transmit a discovery frame during the next discovery window after said deferring.

In various embodiments, the medium can further include code that, when executed, causes the apparatus to defer by determining an adjustment $b=\max(0, (K-m_{-1}-c))$, and deferring for $b+m$ discovery windows. m−1 can include an integer m computed for a previous transmission, and c can include a number of discovery windows that have elapsed since the previous transmission In various embodiments, the medium can further include code that, when executed, causes the apparatus to determine the discovery window interval K by determining a transmission end time for a discovery window, comparing the transmission end time to a threshold time smaller than a size of the discovery window, increasing K when the transmission end time is greater than or equal to the threshold time, and decreasing K when the transmission end time is less than the threshold time. The medium can further include code that, when executed, causes the apparatus to increase K by setting K to the minimum of: a maximum K, and a previous K plus a constant. The medium can further include code that, when executed, causes the apparatus to increase K by setting K to the minimum of: a maximum K, and a previous K times a constant greater than one. The medium can further include code that, when executed, causes the apparatus to decrease K by setting K to the maximum of: a minimum K, and a previous K minus a constant. The medium can further include code that, when executed, causes the apparatus to decrease K by setting K to the maximum of: a minimum K, and a previous K times a constant less than one.

DETAILED DESCRIPTION

Figure 1A:
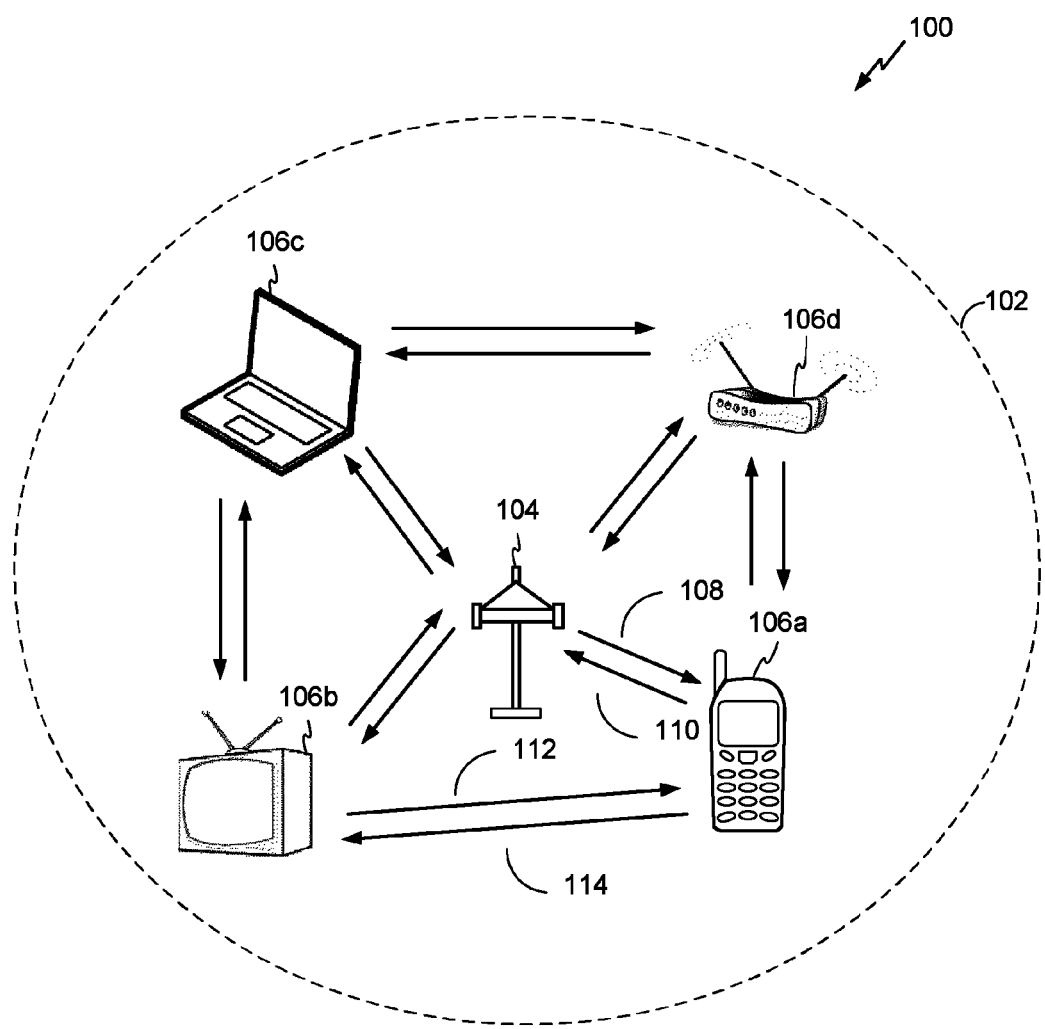
FIG. 1A illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. However, the various aspects described herein can apply to any communication standard, such as a wireless protocol.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized backoff period i.e. an additional period of time in which the node wishing to transmit will not attempt to access the medium. The backoff period is used to resolve contention between different nodes trying to access a medium at the same time. The backoff period may also be referred to as a contention window. Backoff includes each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node, it will increase the maximum number of the range exponentially. If, on the other hand, a node wishing to transmit senses the medium as free for a specified time (called the Distributed Inter Frame Space (DIFS) in the 802.11 standard), then the node is allowed to transmit on the medium. After transmitting, the receiving node will perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

In wireless communications such as those described herein, multiple stations share a transmission medium using a media access control protocol such as the carrier sense multiple access (CSMA) described above. In certain embodiments, static-start contention windows can be used, as discussed further herein, with various attendant benefits and drawbacks. In other embodiments, randomized-start contention windows can be used, with differing attendant benefits and drawbacks. In some embodiments, it can be beneficial for nodes to implement a combination of static-start and randomized-start contention windows.

FIG. 1A illustrates an example of a wireless communication system 100. The wireless communication system 100 can operate pursuant to a wireless standard, such as an 802.11 standard. The wireless communication system 100 can include an AP 104, which communicates with STAs. In some aspects, the wireless communication system 100 can include more than one AP. Additionally, the STAs can communicate with other STAs. As an example, a first STA 106a can communicate with a second STA 106b. As another example, a first STA 106a can communicate with a third STA 106c although this communication link is not illustrated in FIG. 1A.

A variety of processes and methods can be used for transmissions in the wireless communication system 100 between the AP 104 and the STAs and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs and between an individual STA, such as the first STA 106a, and another individual STA, such as the second STA 106b, in accordance with CDMA techniques. If this is the case, the wireless communication system 100 can be referred to as a CDMA system.

A communication link can be established between STAs. Some possible communication links between STAs are illustrated in FIG. 1A. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs associated with the AP 104 and that use the AP 104 for communication can be referred to as a basic service set (BSS).

It should be noted that the wireless communication system 100 may not have a central AP 104, but rather can function as a peer-to-peer network between the STAs. Accordingly, the functions of the AP 104 described herein can alternatively be performed by one or more of the STAs.

Figure 1B:
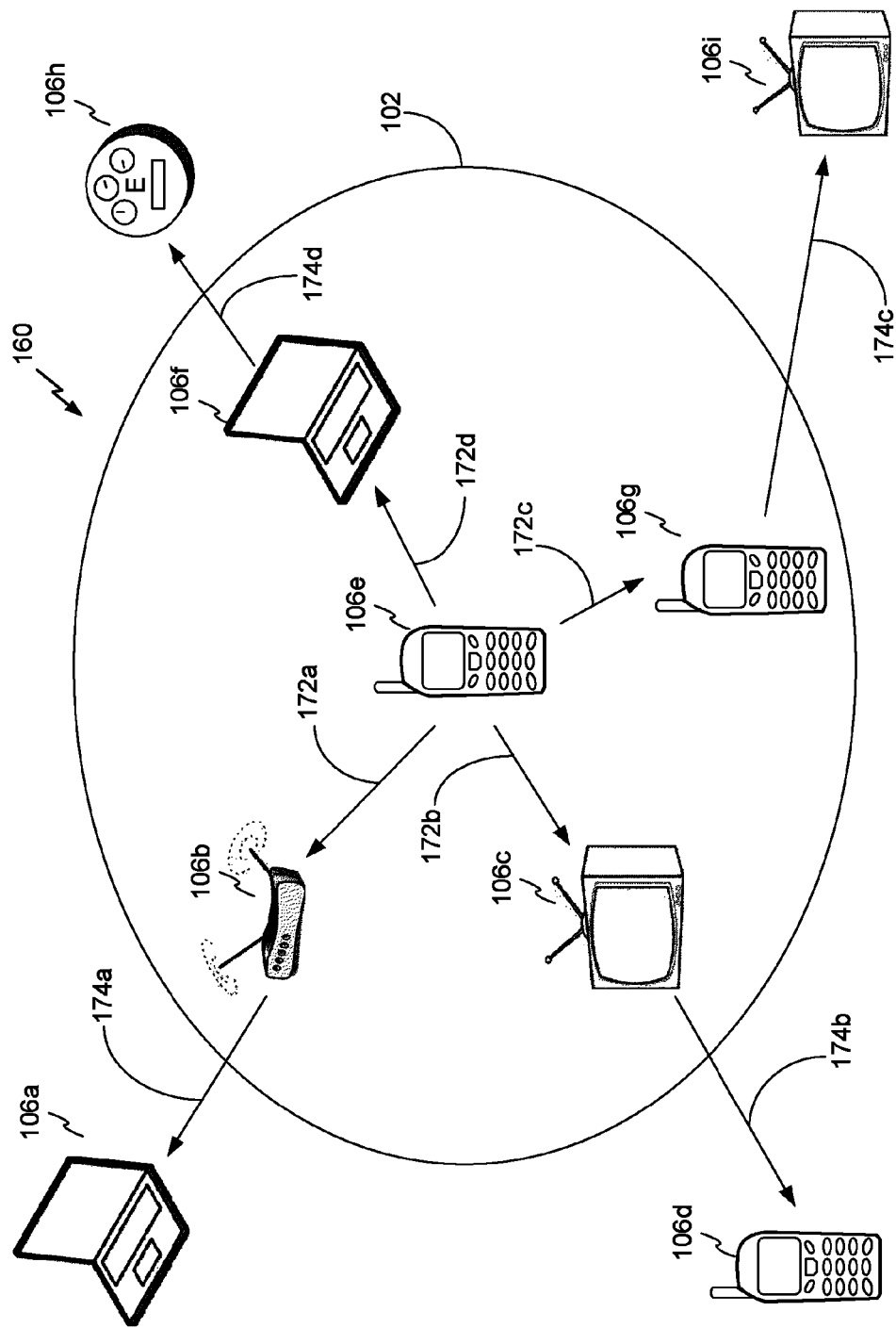
FIG. 1B illustrates another example of a wireless communication system.

FIG. 1B illustrates an example of a wireless communication system 160 that can function as a peer-to-peer network. For example, the wireless communication system 160 in FIG. 1B shows STAs 106a-106i that can communicate with each other without the presence of an AP. As such, the STAs, 106a-106i can be configured to communicate in different ways to coordinate transmission and reception of messages to prevent interference and accomplish various tasks. In one aspect, the networks shown in FIG. 1B can be configured as a "neighborhood aware networking" (NAN). In one aspect, a NAN can refer to a network for communication between STAs that are located in close proximity to each other. In some cases the STAs operating within the NAN can belong to different network structures (e.g., STAs in different homes or buildings as part of independent LANs with different external network connections).

In some aspects, a communication protocol used for communication between nodes on the peer-to-peer communications network 160 can schedule periods of time during which communication between network nodes can occur. These periods of time when communication occurs between STAs 106a-106i can be known as availability windows. An availability window can include a discovery interval or paging interval as discussed further below.

The protocol can also define other periods of time when no communication between nodes of the network is to occur. In some embodiments, nodes can enter one or more sleep states when the peer-to-peer network 160 is not in an availability window. Alternatively, in some embodiments, portions of the stations 106a-106i can enter a sleep state when the peer-to-peer network is not in an availability window. For example, some stations can include networking hardware that enters a sleep state when the peer-to-peer network is not in an availability window, while other hardware included in the STA, for example, a processor, an electronic display, or the like do not enter a sleep state when the peer-to-peer network is not in an availability window.

The peer-to-peer communication network 160 can assign one nodes to be a root node, or can assign one or more nodes to be master nodes. In FIG. 1B, the assigned root node is shown as STA 106e. In peer-to-peer network 160, the root node is responsible for periodically transmitting synchronization signals to other nodes in the peer-to-peer network. The synchronization signals transmitted by root node 160e can provide a timing reference for other nodes 106a-d and 106f-i to coordinate an availability window during which communication occurs between the nodes. For example, a synchronization message 172a-172d can be transmitted by root node 106e and received by nodes 106b-106c and 106f-106g. The synchronization message 172 can provide a timing source for the STAs 106b-c and 106f-106g. The synchronization message 172 can also provide updates to a schedule for future availability windows. The synchronization messages 172 can also function to notify STAs 106b-106c and 106f-106g that they are still present in the peer-to-peer network 160.

Some of the nodes in the peer-to-peer communication network 160 can function as branch synchronization nodes. A branch synchronization node can retransmit both availability window schedule and master clock information received from a root node. In some embodiments, synchronization messages transmitted by a root node can include availability window schedule and master clock information. In these embodiments, the synchronization messages can be retransmitted by the branch synchronization nodes. In FIG. 1B, STAs 106b-106c and 106f-106g are shown functioning as branch-synchronization nodes in the peer-to-peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g can extend the range and improve the robustness of the peer-to-peer network 160.

The retransmitted synchronization messages 174a-174d are received by nodes 106a, 106d, 106h, and 106i. These nodes can be characterized as "leaf" nodes, in that they do not retransmit the synchronization message they receive from either the root node 106e or the branch synchronization nodes 106b-106c or 106f-106g. In some embodiments, a plurality of nodes can negotiate transmission of synchronization signals as discussed in greater detail herein.

Synchronization messages, or synchronization frames, can be transmitted periodically. However, periodic transmission of synchronization messages can be problematic for the nodes 106. These problems can be caused by the nodes 106 having to repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network.

When a new wireless device enters a location with a NAN, the wireless device can scan the airwaves for discovery and synchronization information before joining the NAN. It would be advantageous if the information necessary for the STA to join the NAN was quickly accessible to the STA.

In addition, the transmission and retransmissions of synchronization and/or discovery messages by the nodes 106 within a NAN can introduce a large amount of unnecessary overhead to the network.

Figure 2:
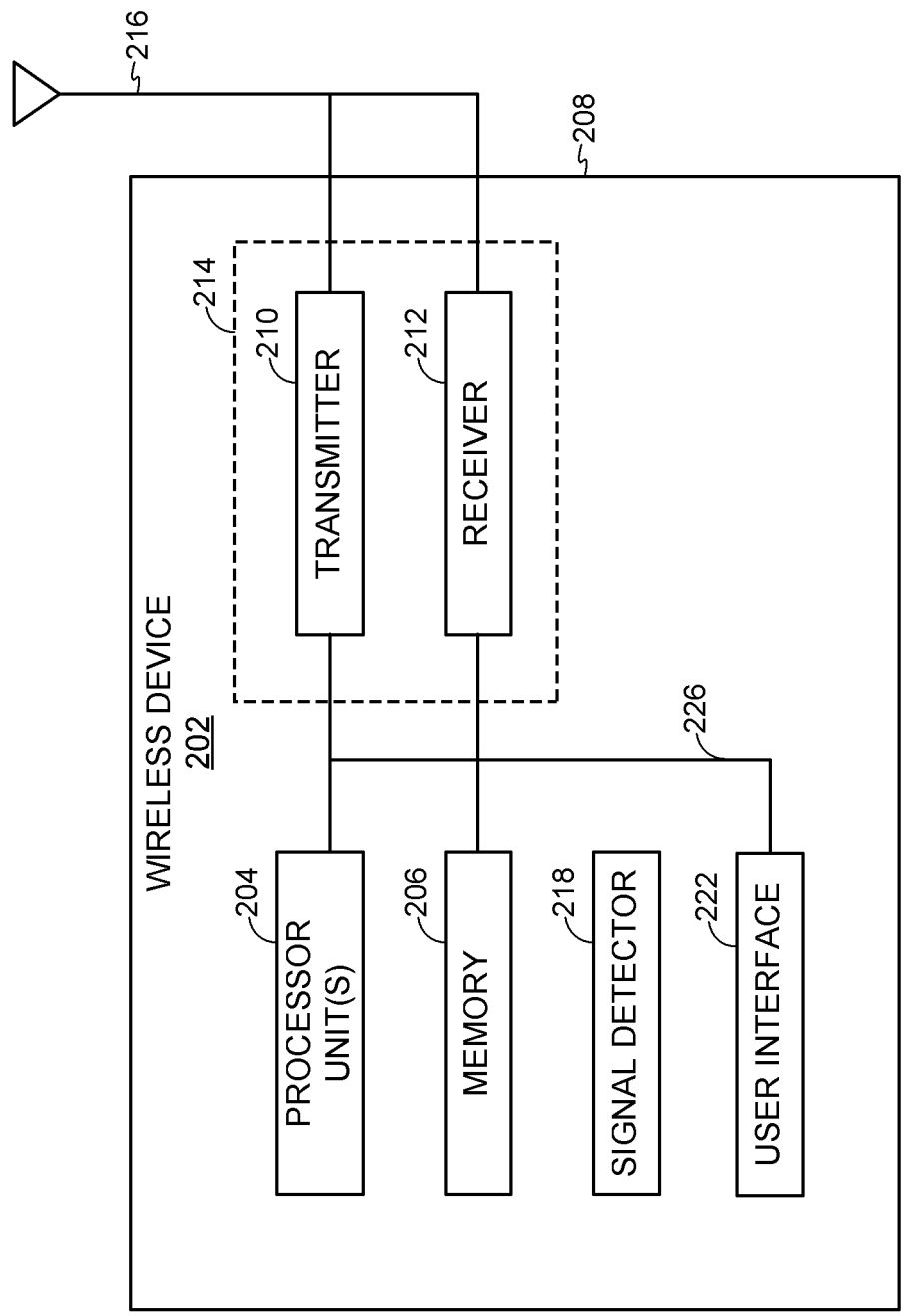
FIG. 2 illustrates a functional block diagram of a wireless device that can be employed within the wireless communication system of FIG. 1.

FIG. 2 illustrates various components that can be utilized in a wireless device 202 that can be employed within the wireless communication system 100 or 160. The wireless device 202 is an example of a device that can be configured to implement the various methods described herein. For example, the wireless device 202 can include the AP 104 or one of the STAs.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Devices, such as STAs, 106a-106i shown in FIG. 1B, for example, can be used for neighborhood-aware networking, or NANing. For example, various stations within the network can communicate on a device to device (e.g., peer-to-peer communications) basis with one another regarding applications that each of the stations supports. A discovery protocol can be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network can be designated as the root device or node. In some embodiments, the root device can be an ordinary device, like the other devices in the network, rather than a specialized device such as a router. In NAN, the root node can be responsible for periodically transmitting synchronization messages, or synchronization signals or frames, to other nodes in the network. The synchronization messages transmitted by root node can provide a timing reference for other nodes to coordinate an availability window during which communication occurs between the nodes. The synchronization message can also provide updates to a schedule for future availability windows. The synchronization messages can also function to notify STAs that they are still present in the peer-to-peer network.

In a Neighborhood aware Network (NAN), STAs on the network can use synchronization messages transmitted by a root STA and retransmitted by branch STAs in order to determine availability windows. During these availability windows, STAs in the NAN can be configured to transmit and/or receive messages from other STAs on the network. At other times, STAs, or portions of STAs, on the NAN can be in a sleep state. For example, an STA on a NAN, such as wireless device 202, can enter a sleep state based at least in part on synchronization messages received from a root node. In some embodiments, STAs on a NAN can enter a sleep mode, where one or more elements of the STA can enter a sleep mode, rather than the entire STA. For example, STA 202 can enter a sleep mode where the transmitter 210, receiver 212, and/or transceiver 214 can enter a sleep mode based on synchronization messages received on a NAN. This sleep mode can enable the STA 202 to conserve power or battery life.

Figure 3:
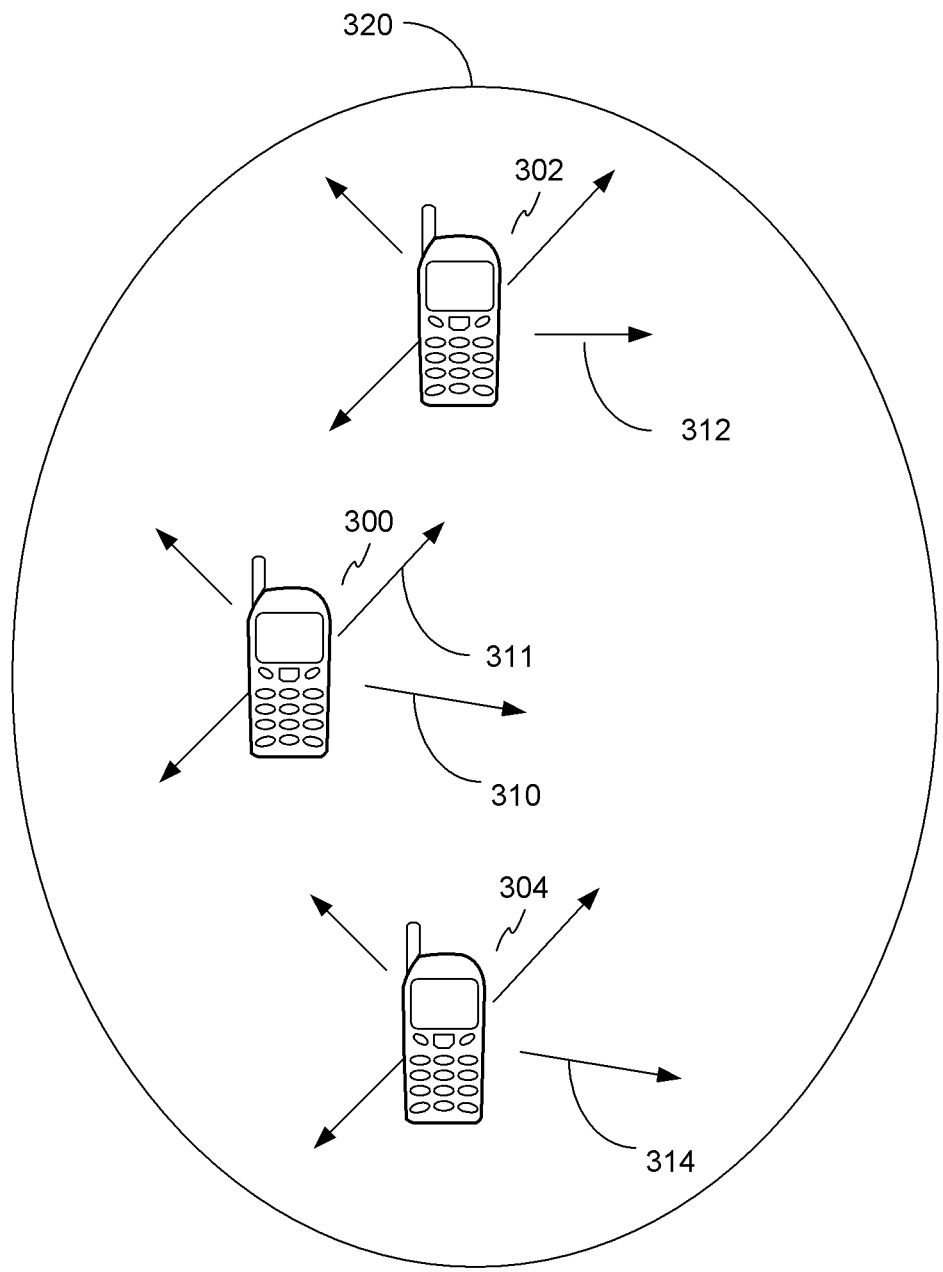
FIG. 3 illustrates an example of a communication system in which aspects of the present disclosure can be employed.

FIG. 3 illustrates an example of a NAN 320 in which aspects of the present disclosure can be employed. A master STA 300 of the network provides synchronization information to the nodes. In this way, the master STA 300 is configured to transmit and receive messages 310, 311, 312, and 314 with the STAs on the NAN 320.

STAs 300, 302, and 304 can be nodes on the NAN 320. As nodes on the NAN 320, STAs 300, 302, and 304 can transmit messages 312, and 314 to other STAs on the network 320. These messages can be transmitted to other STAs during an availability window, during which time each STA is configured to transmit and/or receive transmissions from other STAs on the network 320. For example, STA 302 can transmit messages 312 to STA 304 during an availability window for both STAs, where the availability windows is based in part upon a synchronization message received from a root STA.

Because STAs on the NAN 320 are wireless and can have a finite amount of power between charges, it is advantageous if the STAs do not repeatedly wake from a sleep state to periodically transmit and/or receive synchronization messages between the STAs of the NAN 320. Thus, it would be advantageous if the STAs 300, 302, and 304 were able to stay longer in a sleep state to conserve power and not wake from the sleep state to transmit and/or receive synchronization messages on the network.

Master STA 300 can periodically transmit synchronization messages within the NAN 320. In some embodiments, synchronization messages can indicate the frequency of availability windows for STAs in the network 320, and can further indicate the frequency of synchronization messages and/or the interval until the next synchronization message. In this way, master STA 300 provides synchronization and some discovery functionality to the network 320. Since the master STA may not go to sleep, or can sleep less often than other nodes, the master STA is able to coordinate discovery and timing for the NAN 320 independent of the state of the STAs 302, and 304. In this way, the STAs 302, and 304 rely on the master STA 300 for this functionality and can stay longer in the sleep state to save power.

Figure 4:
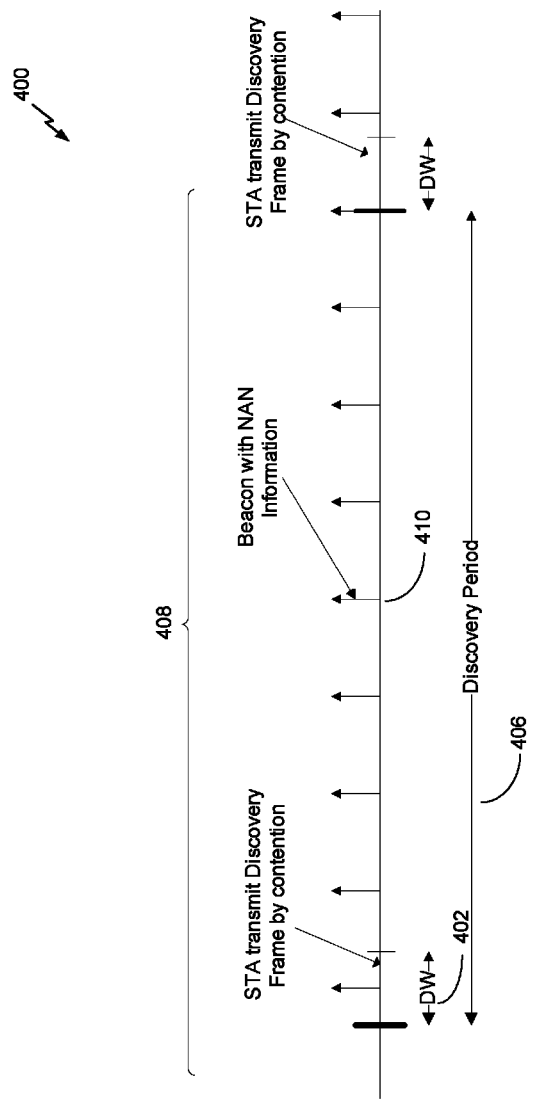
FIG. 4 illustrates an exemplary discovery window structure for an STA to communicate with an AP to discover a NAN in accordance with an exemplary implementation of the invention.

FIG. 4 illustrates an exemplary discovery window structure for an STA to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

During the DW 402, STAs can advertise services through broadcast messages such as discovery packets or discovery frames. STAs can listen to broadcast messages transmitted by other STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 402. STA responses to the transmitted discovery queries are transmitted during the DP 406. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

The STA which sent the request for a NAN 320 subsequently wakes up to receive a beacon. The STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 which is responsive to the probe request of the STA.

The start and end of the DW 402 can be known via numerous methods to each STA desiring to transmit a probe or discovery query. In some aspects, each STA can wait for a beacon. The beacon can specify the start and end of the DW 402.

Figure 5:
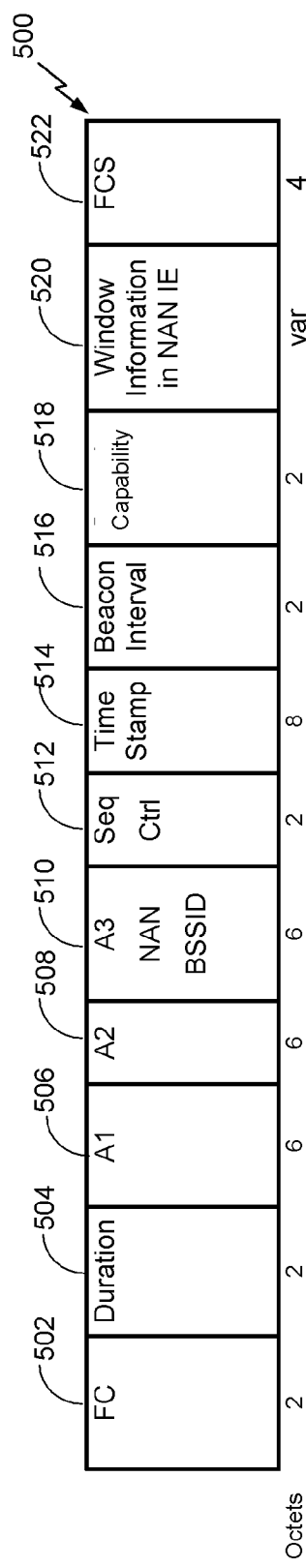
FIG. 5 shows an exemplary structure of a media access control (MAC) frame 500.

FIG. 5 shows an exemplary structure of a media access control (MAC) frame 500. In some aspects, the media access control frame (MAC) 500 can be utilized for the beacon signal 410 discussed above. As shown, the MAC frame 500 includes 11 different fields: a frame control (fc) field 502 a duration/identification (dur) field 504, a receiver address (a1) field 506, a transmitter address (a2) field 508, a destination address (a3) field 510, which in some aspects can indicate a NAN BSSID, a sequence control (sc) field 512, a timestamp field 514, a beacon interval field 516, a capability field 518, an information element 520 including window information, and a frame check sequence (FCS) field 522. The fields 502-522 include a MAC header in some aspects. Each field can be included of one or more sub-fields or fields. For example, frame control field 502 of media access control header 500 can be included of multiple subfields, such as a protocol version, type field, subtype field, and other fields. In some embodiments, the capability field 518 can include a mater preference value (MPV).

In some aspects, the NAN BSSID field 510 can indicate a cluster of NAN devices. In another embodiment, each NAN can have a different (for example, pseudorandom) NAN BSSID 510. In an embodiment, the NAN BSSID 510 can be based on a service application. For example, a NAN created by Application A can have a BSSID 510 based on an identifier of Application A. In some embodiments, the NAN BSSID 510 can be defined by a standards-body. In some embodiments, the NAN BSSID 510 can be based on other contextual information and/or device characteristics such as, for example, a device location, a server-assigned ID, etc. In one example, the NAN BSSID 510 can include a hash of the latitude and longitude location of the NAN. The NAN BSSID field 510 shown is six octets long. In some implementations, NAN BSSID field 510 can be four, five, or eight octets long. In some embodiments, the AP 104 can indicate the NAN BSSID 510 in an information element.

Figure 6A:
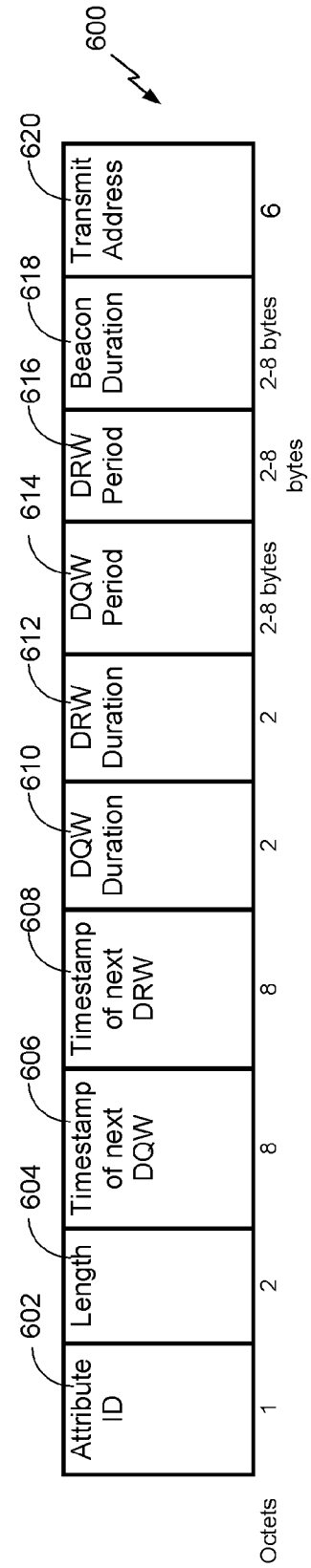
FIG. 6A shows an exemplary attribute of a NAN information element (IE) that can be employed within the NAN of FIG. 3.

FIG. 6 shows an exemplary attribute of a NAN information element (IE) 600 that can be employed within the NAN 320 of FIG. 3. In various embodiments, any device described herein, or another compatible device, can transmit the attribute of the NAN IE 600 such as, for example, the AP 104 (FIG. 3). One or more messages in the wireless NAN 320 can include the attribute of the NAN IE 600 such as, for example, the beacon 410. In some aspects, the NAN information element 600 can be included in MAC header 500 field 520 as described above.

As shown in FIG. 6, the attribute of the NAN IE 600 includes an attribute ID 602, a length field 604, a Timestamp of a next Discovery Query Window (DQW) field 606, a Timestamp of the next Discovery Query Window (DRW) field 608, a Discovery Query Window (DQW) duration field 610, a Discovery Response Window (DRW) duration field 612, a DQW Period field 614, a DRW Period field 616, a Beacon Window field 618, and a transmit address field 620. A person having ordinary skill in the art will appreciate that the attribute of the NAN IE 600 can include additional fields, and fields can be rearranged, removed, and/or resized.

The attribute identifier field 602 shown is one octet long. In some implementations, the attribute identifier field 602 can be two, five, or twelve octets long. In some implementations, the attribute identifier field 602 can be of variable length, such as varying length from signal to signal and/or as between service providers. The attribute identifier field 602 can include a value which identifies the element as an attribute of the NAN IE 600.

The length field 604 can be used to indicate the length of the attribute of the NAN IE 600 or the total length of subsequent fields. The length field 604 shown in FIG. 6 is two octets long. In some implementations, the length field 604 can be one, five, or twelve octets long. In some implementations, the length field 604 can be of variable length, such as varying length from signal to signal and/or as between service providers.

The Timestamp of next DQW field 606 can indicate a start time of the next discovery query window (for example, the start of the next discovery period 406 described above with respect to FIG. 4). In various embodiments, the start time can be indicated using an absolute timestamp or a relative timestamp. The Timestamp of next DQR field 608 can indicate a start time of the next discovery query response (for example, the start of the next discovery query response period described below with respect to FIGS. 7-9). In various embodiments, the start time can be indicated using an absolute timestamp or a relative timestamp.

The DQW duration field 610 can indicate a duration of the DQW (for example, the duration of the DQW described below with respect to FIG. 7-9). In various embodiments, the DQW duration field 610 can indicate the duration of the DQW in ms, µs, time units (TUs), or another unit. In some embodiments, time units can be 1024 µs. The DQW duration field 610 shown is two octets long. In some implementations, DQW duration field 610 can be four, six, or eight octets long.

The DRW duration field 612 can indicate a duration of the DRW (for example, the duration of the DRW described below with respect to FIG. 7-9). In various embodiments, the DRW duration field 612 can indicate the duration of the DRW in ms, µs, time units (TUs), or another unit. In some embodiments, time units can be 1024 µs. The DRW duration field 612 shown is two octets long. In some implementations, DRW duration field 612 can be four, six, or eight octets long.

In some embodiments, the DQW period field 614 can indicate a length of the DQW (described below with respect to FIGS. 7-9). In various embodiments, the DQW period field 614 can indicate the length of the DQW in ms, µs, time units (TUs), or another unit. In some embodiments, time units can be 1024 µs. The DQW period field 614 shown is between two and eight octets long. In some implementations, the DQW period field 614 can be two, four, six, or eight octets long.

In some embodiments, the DRW period field 616 can indicate a length of the DRW (described below with respect to FIGS. 7-9). In various embodiments, the DRW period field 616 can indicate the length of the DRW in ms, µs, time units (TUs), or another unit. In some embodiments, time units can be 1024 µs. The DRW period field 616 shown is between two and eight octets long. In some implementations, the DRW period field 616 can be two, four, six, or eight octets long.

The Beacon Duration field 618 can indicate a duration of a Beacon Window (for example, the duration of the Beacon Window described below with respect to FIGS. 7-9). In various embodiments, the Beacon Duration field 618 can indicate the duration of the Beacon Window in ms, µs, time units (TUs), or another unit. In some embodiments, time units can be 1024 µs. The Beacon Window field 618 shown is between two and eight octets long. In some implementations, Beacon Window field 618 can be four, six, or eight octets long.

The Transmit Address field 620 indicates a network address of a node transmitting the NAN IE 600. In some aspects, the A3 field 510 of the MAC header 500 discussed above with respect to FIG. 5 will instead be set to a NAN BSSID. Therefore, NAN IE 600 provides the transmitter address field 620 to enable receivers to determine the network address of the transmitter.

Figure 6B:
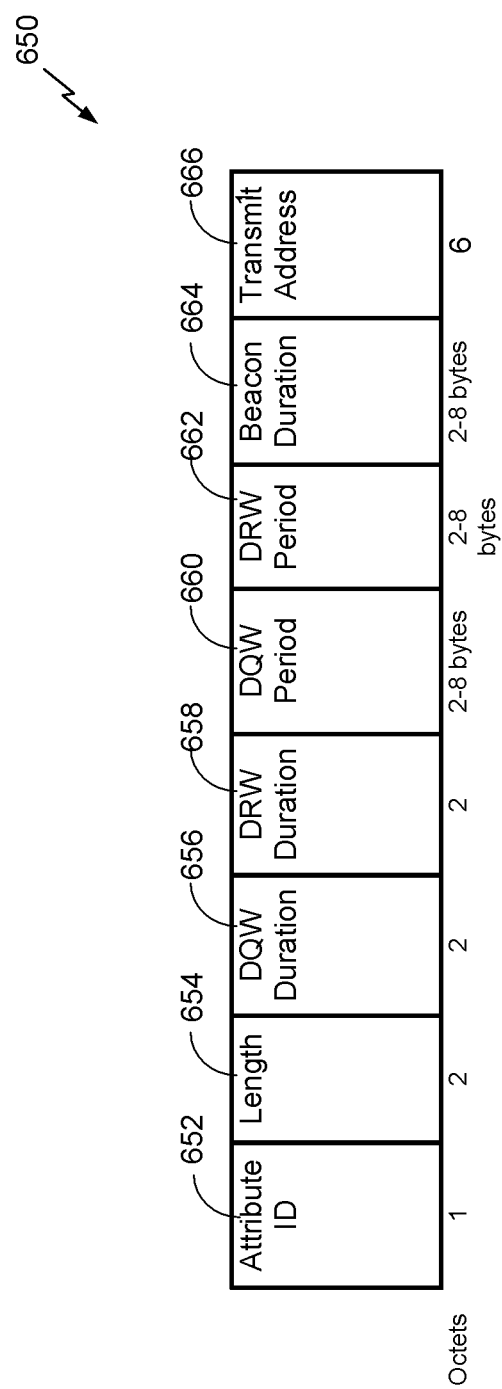
FIG. 6B shows another exemplary attribute of a NAN information element (IE) that can be employed within the NAN of FIG. 3.

FIG. 6B shows another exemplary attribute of a NAN information element (IE) 650 that can be employed within the NAN 320 of FIG. 3. In various embodiments, any device described herein, or another compatible device, can transmit the attribute of the NAN IE 650 such as, for example, the AP 104 (FIG. 3). One or more messages in the wireless NAN 320 can include the attribute of the NAN IE 650 such as, for example, the beacon 410. In some aspects, the NAN information element 650 can be included in MAC header 500 field 520 as described above.

NAN information element 650 differs from NAN information element 600 in that the discovery query window timestamp and the discovery query response window timestamp have been removed from NAN information element 650 relative to NAN information element 600. In some aspects, a receiver of NAN information element 650 can determine a discovery query window start time as the time when a local clock reference that is synchronized to a NAN clock reference is evenly divided by the DQW period field 660 (Station Clock mod DQW period=0). Similarly, the discovery response window start time can be determined in some aspects based on when a local clock synchronized to a NAN clock reference is evenly divided by the DRW period field 662 (Station Clock mod DRW period=0). Note that these example methods of determining a discovery query window or discovery response window start time are similar to the method used to determine a beacon window start time, which can be found in some aspects as Station Clock mod Beacon Interval=0).

Figure 7:
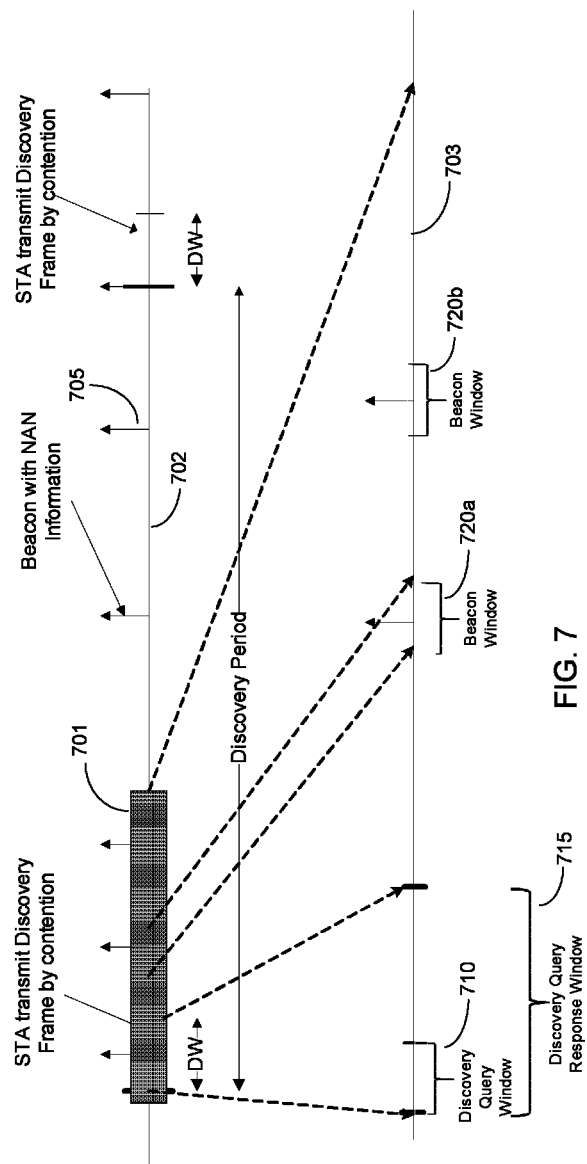
FIG. 7 is a timing diagram illustrating one embodiment of a beacon window, discovery query window, and discovery query response window.

FIG. 7 is a timing diagram illustrating one embodiment of a beacon window, discovery query window, and discovery query response window. A portion 701 of the timeline 702 is expanded as the lower timeline 703. Timeline 702 shows a series of beacon signals 705. Shown on the expanded timeline 703 are a discovery window 710 and a discovery query response window 715. Expanded timeline 703 also shows that one or more beacon windows 720a-b can occur within the discovery period. In an embodiment, sync frames can be transmitted during the beacon window. In some embodiments, sync frames can be transmitted at a specific target beacon transmission time (TBTT) within the beacon window. In the illustrated embodiment, the discovery query window 710 is completely within the discovery query response window 715.

Figure 8:
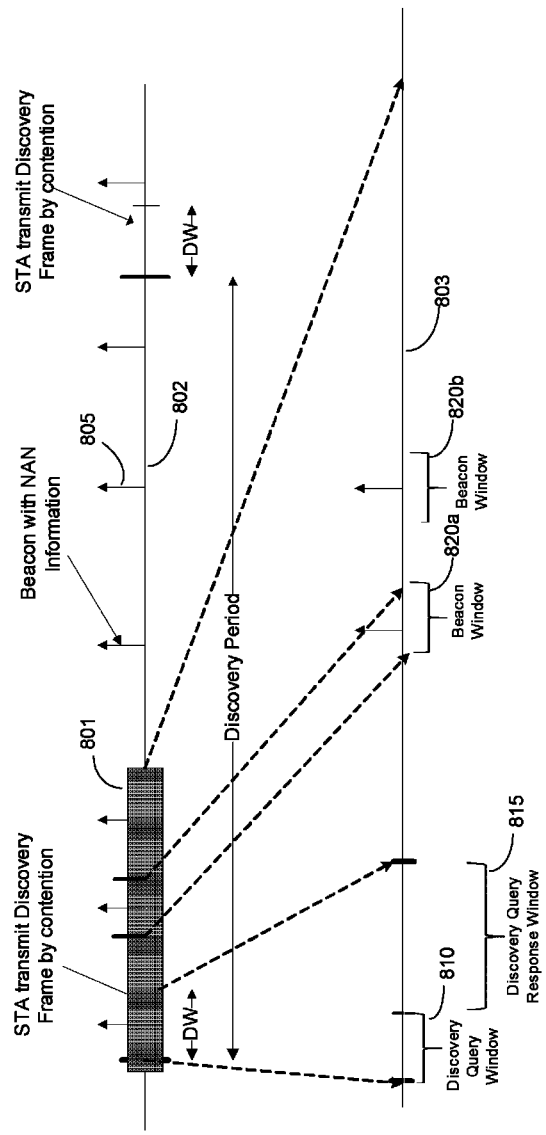
FIG. 8 is a timing diagram illustrating one embodiment of a beacon window, discovery query window, and discovery query response window.

FIG. 8 is a timing diagram illustrating one embodiment of a beacon window, discovery query window, and discovery query response window. A portion 801 of the timeline 802 is expanded as the lower timeline 803. Timeline 802 shows a series of beacon signals 805. Shown on the expanded timeline 803 are a discovery window 810 and a discovery query response window 815. Expanded timeline 803 also shows that one or more beacon windows 820a-b can occur within the discovery period. In the illustrated embodiment of FIG. 8, the discovery query window 810 does not overlap the discovery query response window 815. Instead, the discovery query response window 815 immediately follows the end of the discovery query window 810.

Figure 9:
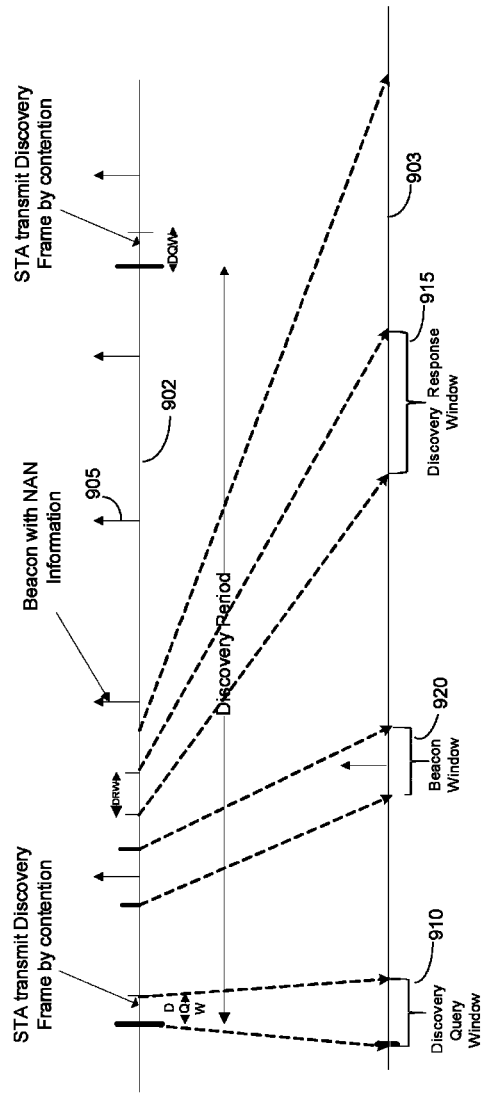
FIG. 9 is a timing diagram illustrating one embodiment of a beacon window, discovery query window, and discovery query response window.

FIG. 9 is a timing diagram illustrating one embodiment of a beacon window, discovery query window, and discovery query response window. A portion of timeline 902 is expanded as the lower timeline 903. Timeline 902 shows a series of beacon signals 905. Shown on the expanded timeline 903 are a discovery window 910 and a discovery query response window 915. Expanded timeline 903 also shows that one or more beacon windows 920 can occur within the discovery period. In the illustrated embodiment of FIG. 9, the timing of the discovery query window 910 is unrelated to the timing of the discovery query response window 915.

Figure 10:
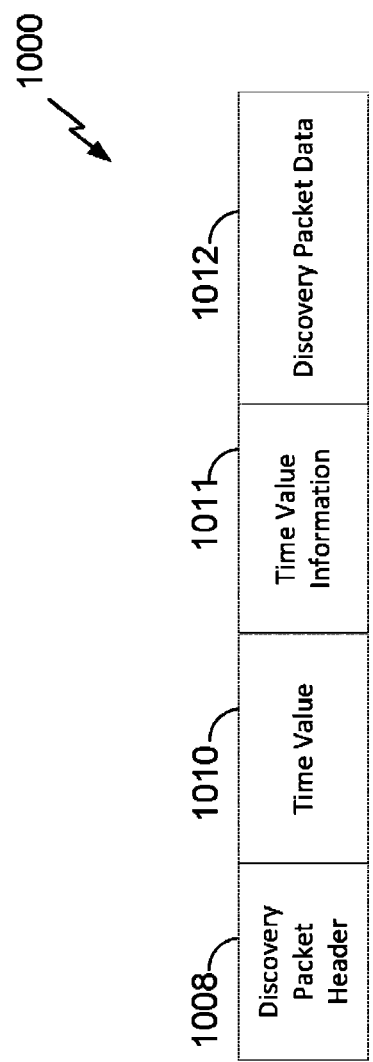
FIG. 10 illustrates a message that can include a time value for synchronization.

FIG. 10 illustrates a message 1000 that can include a time value for synchronization. As described above, in some embodiments, the message 1000 can correspond to a discovery message as described above. The message 1000 can include a discovery packet header 1008. The message can further include 1010 a time value for synchronization 1010. In some embodiments, the discovery packet header 1008 can include the time value 1010. The time value can correspond to a current time value of a clock signal of a STA 106 transmitting the message 1000. In addition the message 1000 can include time value information 1011 that can relate to the accuracy of the time value or how it might be used in synchronization. In an embodiment, the time value information 1011 can include the MPV of the STA 106. The message 1000 can further include discovery packet data 1012. While FIG. 10 shows discovery message serving as the sync message, it should be appreciated that according to other embodiments, the sync message can be sent apart from the discovery message. Moreover, a person having ordinary skill in the art will appreciate that the various fields described herein can be rearranged, resized, some fields can be omitted, and additional fields can be added.

Figure 11:
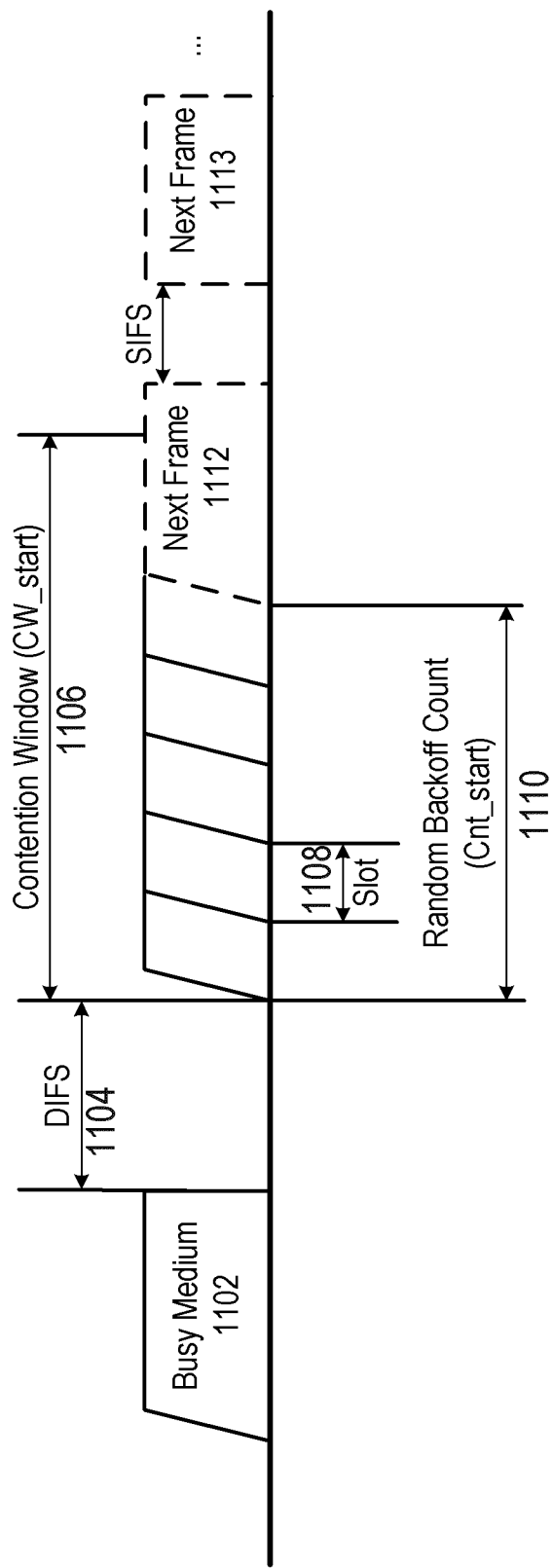
FIG. 11 is a diagram showing static-start time intervals used in a CSMA scheme that can be employed by a wireless device of FIG. 2 operating in the wireless network of FIG. 1.

FIG. 11 is a diagram showing static-start time intervals used in a CSMA scheme that can be employed by a wireless device 202 of FIG. 2 operating in the wireless network 100 of FIG. 1. To avoid collisions, a wireless device 202 that has prepared a frame for transmission first senses the wireless medium. The frame can be, for example, a discovery frame prepared for transmission during the discovery window 402 (FIG. 4). The wireless device 202 can sense that the wireless medium is busy as shown by time interval 1102. If the wireless medium is busy, the wireless device 202 defers for a fixed time duration such as the DCF Interframe Spacing (DIFS) as shown by the DIFS time interval 1104. In addition to deferring for the DIFS time interval, the wireless device 202 can also defer for some portion of a contention window (CW_start) as shown by time interval 1106. The contention window 1106 is divided into a number of time slots as shown by time slot 1108. The wireless device 202 pseudo-randomly selects a number of time slots within the contention window 1106 to further defer access to the wireless medium beyond the DIFS time interval 1104. This is shown by the random backoff count (Cnt_start) 1110 time interval which selects some number of slots less than or equal to the number of slots in the contention window 1106.

After selecting the random backoff count 1110, the wireless device 202 further defers and senses the wireless medium during each slot 1108 of the random backoff count 1110. If the wireless medium continues to be idle for the duration of the random backoff count 1110, the wireless device 202 can transmit a frame as indicated by the next frame 1112. If the wireless device 202 senses that the wireless medium is busy during any of the slots of the random backoff count 1110, the wireless device 202 waits until the medium is idle, defers for a DIFS period, and then resumes the backoff count 1110. For example, the random backoff count 1110 can be pseudo-randomly determined to be six slots. After deferring for 3 slots, the wireless device 202 can sense that the wireless medium is busy. In response, the wireless device 202 waits until the wireless medium becomes idle, defers for a DIFS period, and then resumes counting down for 3 additional slots. Accordingly, multiple devices attempting to transmit will select a different number of slots such that each will defer for a different amount of time to prevent collisions and allow each wireless device 202 to transmit prepared frames.

In various embodiments, the wireless device 202 can transmit one or more additional frames 1113 after winning contention for the wireless medium. The additional frames 1113 can be separated by a short inter-frame space (SIFS). The number of additional frames 1113 can be limited to a maximum of N1. In various embodiments, N1 can be between around 1 and around 10, between around 2 and around 5, and more particularly, around 3. Additionally or alternatively, the total time occupied by transmission of the frames can be limited to a maximum of T1. In various embodiments, T1 can be between around 0.5 ms and around 1.5 ms, between around 0.75 ms and 0.125 ms, and more particularly, around 1 ms.

The size of the contention window 1106 can be a function of a number of unsuccessful transmissions. For example, the initial size of the contention window 1106 can be set to a minimum contention window size (CWmin) that is used after successful transmissions. When the size of the contention window 1106 is at the minimum size, the number of slots chosen for the random backoff is selected to be less than or equal to the minimum size. If a transmission is unsuccessful, it can be assumed that a collision can possibly have occurred. As such, the size of the contention window 1106 (i.e., number of slots) can be increased such that it is more likely that the random backoff count 1110 will be larger. For example, the size of the contention window 1106 can double for each unsuccessful frame transmission until the size of the contention window 1106 is at a maximum size (CWmax).

The number of wireless devices within the network 100 and contending for the same wireless medium can impact the performance of the CSMA mechanism. As the number of devices operating within the network increases, the CSMA mechanism may not be able to adequately support transmissions for a dense network. For example, as a non-limiting example, if the contention window is set to 10 slots, but there are 30 or more devices contending for the wireless medium, it is likely that several wireless device can choose the same random backoff count 1110. This can lead to collisions and/or devices experiencing long delays when waiting for the wireless medium to be sufficiently idle to allow the wireless device 202 to transmit prepared data. In some embodiments, the contention window 1106 size can be chosen based on a number of devices in a NAN. For example, the contention window 1106 size can be from around 2 times to around 10 times the number of devices in the NAN. In an embodiment, the contention window 1106 size can be from around 3 times to around 7 times the number of devices in the NAN, and more particularly around 5 times the number of devices in the NAN.

In accordance with one or more embodiment described herein, the CSMA mechanism can be modified to support more users. For example, modifications according to embodiments described herein can allow an access point 104 to support a greater number of wireless devices. In addition a greater number of wireless devices can access the wireless medium more efficiently. In addition, there can be less "wasted" time due and overall efficiency of the CSMA mechanism can be improved. For example, a relatively large static-start contention window (such as the contention window 1106 described above with respect to FIG. 11) can cause excessive deferral to traffic from non-NAN devices. As such, in accordance with one embodiment, wireless devices 202 can implement a randomized-start contention window, as described below with respect to FIG. 12. In some embodiments, a randomized-start contention window can cause devices 202 to remain awake for an excessive amount of time (for example, the entire discovery window 40). In some embodiments, the static-start contention window and the randomized-start contention window can be implemented in combination.

Figure 12:
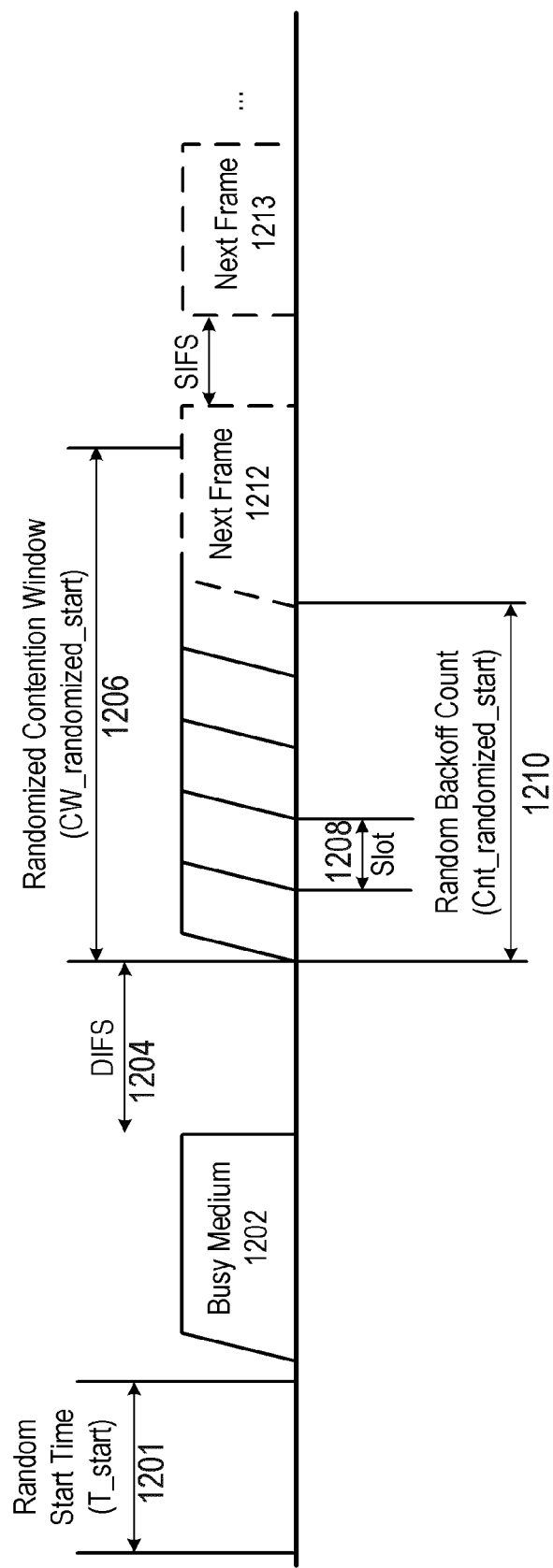
FIG. 12 is a diagram showing randomized-start time intervals that may be used in a CSMA scheme that may be employed by a wireless device of FIG. 2.

FIG. 12 is a diagram showing randomized-start time intervals that may be used in a CSMA scheme that may be employed by a wireless device 202 of FIG. 2. In accordance with this an embodiment, an additional time period referred to as a random start time (T_start) 1201 is provided. In an embodiment, the device 202 can choose the random start time (T_start) 1201 within the discovery window 402 (FIG. 4). For example, the device 202 can choose T_start 1203 randomly or pseudo-randomly, using a uniform distribution within the discovery window 402. In some embodiments, a portion of the discovery window 402 may have already elapsed when the device 202 is ready to transmit a packet. In some embodiments, the device 202 can choose T_start 1203 randomly or pseudo-randomly, using a uniform distribution within a remaining portion of the discovery window 402.

To avoid collisions, a wireless device 202 that has prepared a frame for transmission first waits until the random start time (T_start) 1201 has elapsed. The frame can be, for example, a discovery frame prepared for transmission during the discovery window 402 (FIG. 4). The wireless device 202 then senses the wireless medium. The wireless device 202 can sense that the wireless medium is busy as shown by time interval 1202. If the wireless medium is busy, the wireless device 202 defers for a fixed time duration such as the DCF Interframe Spacing (DIFS) as shown by the DIFS time interval 1204. In addition to deferring for the DIFS time interval, the wireless device 202 can also defer for some portion of a randomized contention window (CW_randomized_start) as shown by time interval 1206. The randomized contention window 1206 is divided into a number of time slots as shown by time slot 1208. The wireless device 202 pseudo-randomly selects a number of time slots within the randomized contention window 1206 to further defer access to the wireless medium beyond the DIFS time interval 1204. This is shown by the random backoff count (Cnt_randomized_start) 1210 time interval which selects some number of slots less than or equal to the number of slots in the randomized contention window 1206.

After selecting the random backoff count 1210, the wireless device 202 further defers and senses the wireless medium during each slot 1208 of the random backoff count 1210. If the wireless medium continues to be idle for the duration of the random backoff count 1210, the wireless device 202 can transmit a frame as indicated by the next frame 1212. If the wireless device 202 senses that the wireless medium is busy during any of the slots of the random backoff count 1210, the wireless device 202 waits until the medium is idle, defers for a DIFS period, and then resumes the backoff count 1210. For example, the random backoff count 1210 can be pseudo-randomly determined to be six slots. After deferring for 3 slots, the wireless device 202 can sense that the wireless medium is busy. In response, the wireless device 202 waits until the wireless medium becomes idle, defers for a DIFS period, and then resumes counting down for 3 additional slots. Accordingly, multiple devices attempting to transmit will select a different number of slots such that each will defer for a different amount of time to prevent collisions and allow each wireless device 202 to transmit prepared frames.

The size of the randomized contention window 1206 can be a function of a number of unsuccessful transmissions. For example, the initial size of the randomized contention window 1206 can be set to a minimum randomized contention window size (CWmin) that is used after successful transmissions. When the size of the randomized contention window 1206 is at the minimum size, the number of slots chosen for the random backoff is selected to be less than or equal to the minimum size. If a transmission is unsuccessful, it can be assumed that a collision can possibly have occurred. As such, the size of the randomized contention window 1206 (i.e., number of slots) can be increased such that it is more likely that the random backoff count 1210 will be larger. For example, the size of the randomized contention window 1206 can double for each unsuccessful frame transmission until the size of the randomized contention window 1206 is at a maximum size (CWmax).

As discussed above, in some embodiments, the wireless device 202 can implement both the contention window (CW_start) 1106 (FIG. 11) and the randomized contention window (CW_randomized_start) 1206 (FIG. 12). For example, the wireless device 202 can define the contention window (CW_start) 1106 and the randomized contention window (CW_randomized_start) 1206 within the discovery window 402 (FIG. 4). As discussed above, CW_randomized_start 1206 can be a random start time uniformly chosen within the discovery window 402. In some embodiments, CW_randomized_start 1206 can be a random start time uniformly chosen within a remaining portion of the discovery window 402. The wireless device 202 can choose a first random backoff count Cnt_start 1110 based on CW_start 1106 as described above with respect to FIG. 11. The wireless device 202 can choose a second random backoff count Cnt_randomized_start 1210 based on CW_randomized_start 1206 as described above with respect to FIG. 12.

In some embodiments, the randomized contention window 1206 size can be chosen based on a number of devices in a NAN. For example, the randomized contention window 1206 size can be from around 2 times to around 10 times the number of devices in the NAN. In an embodiment, the randomized contention window 1206 size can be from around 3 times to around 7 times the number of devices in the NAN, and more particularly around 5 times the number of devices in the NAN. In some embodiments, the randomized contention window 1206 size can be smaller than the contention window 1106 size. For example, the randomized contention window 1206 can be from around 0 to around 31 slots, and more preferably around 15 slots. The contention window 1106 can be from around 0 to around 100 slots. In various embodiments, the "size" of a contention window can refer to a maximum backoff count.

Figure 13:
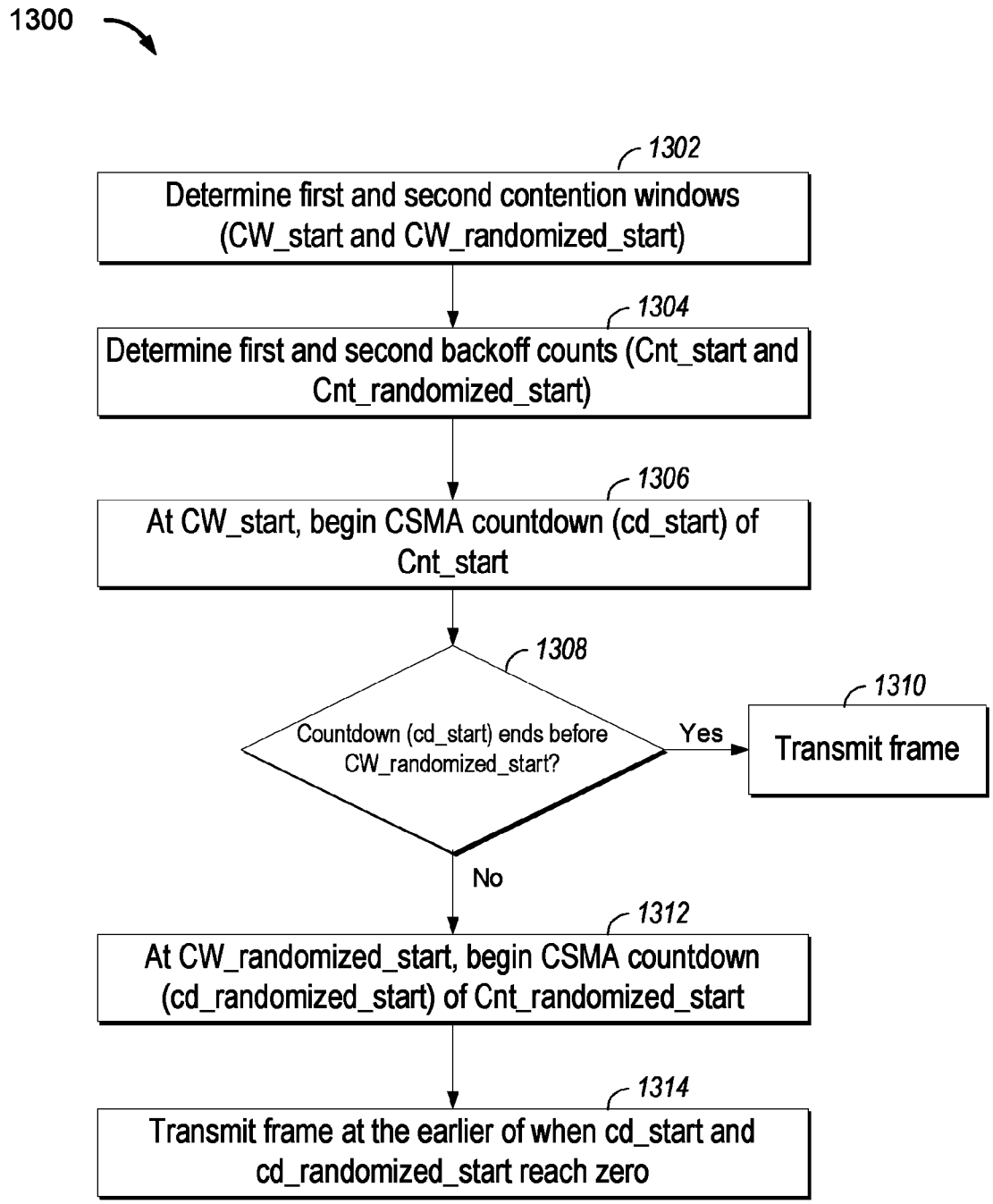
FIG. 13 shows a flowchart of a method of transmitting a prepared frame in accordance with an embodiment.

FIG. 13 shows a flowchart 1300 of a method of transmitting a prepared frame in accordance with an embodiment. In various embodiments, the prepared frame can be a discovery frame such as the frame 500 (FIG. 5). The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1302, the wireless device 202 can determines first and second contention windows (CW_start and CW_randomized_start). For example, the wireless device 202 can determine a start time and/or size of the contention window (CW_start) 1106 as discussed above with respect to FIG. 11. The wireless device 202 can determine a start time and/or size of the randomized contention window (CW_randomized_start) 1206 as discussed above with respect to FIG. 12. In an embodiment, the wireless device 202 can determine a random start time T_start after which the randomized contention window (CW_randomized_start) 1206 can begin. In an embodiment, the first contention window (CW_start) can begin after the start of the discovery window 402 (FIG. 4).

In an embodiment, T_start and/or the start of the second contention window is randomly or pseudo-randomly selected based on a uniform distribution within an entire discovery window. In an embodiment, T_start and/or the start of the second contention window is randomly or pseudo-randomly selected based on a uniform distribution within a remaining portion of a discovery window.

Next, at block 1304, the wireless device 202 determines first and second backoff counts (Cnt_start and Cnt_randomized_start). For example, the wireless device 202 can determine the first backoff count (Cnt_start) 1110 as discussed above with respect to FIG. 11. The wireless device 202 can determine the second backoff count (Cnt_randomized_start) 1210 as discussed above with respect to FIG. 12. In various embodiments, the first and second backoff counts (Cnt_start and Cnt_randomized_start) are chosen randomly. In various embodiments, the first and second backoff counts (Cnt_start and Cnt_randomized_start) are chosen as random values less than or equal to the size of the first and second contention windows (CW_start and CW_randomized_start), respectively.

In some embodiments, the first contention window (CW_start) is larger than the second contention window (CW_randomized_start). In some embodiments, one or more of the first and second contention windows (CW_start and CW_randomized_start) are based on a number of devices in a NAN. In some embodiments, one or more of the first and second contention windows (CW_start and CW_randomized_start) can be at least five times the number of devices in the NAN. In some embodiments, one or more of the first and second contention windows (CW_start and CW_randomized_start) can be five times the number of devices in the NAN. In some embodiments, one or more of the first and second contention windows (CW_start and CW_randomized_start) can be 15

Then, at block 1306, the wireless device 202 begins a countdown (cd_start), starting from Cnt_start, at the beginning of CW_start. For example, the wireless device 202 can wait until the busy medium 1102 is free, as discussed above with respect to FIG. 11. The device 202 can begin the CSMA countdown (cd_start), starting from Cnt_start 1110 after detecting the medium to be free for the DIFS 1104. Accordingly, the device 202 can begin the CSMA countdown (cd_start) at the beginning of the first contention window (CW_start) 1106.

Thereafter, at block 1308, the wireless device 202 determines whether the countdown (cd_start) has ended before CW_randomized_start. In an embodiment, the wireless device 202 determines whether the countdown (cd_start) has ended before T_start 1201, as discussed above with respect to FIG. 12. For example, if the countdown (cd_start) in the first contention window CW_start 1106 has reached zero before T_start 1201 has elapsed, the wireless device 202 proceeds to transmit the prepared frame 500 (FIG. 5) at block 1310. On the other hand, if T_start 1201 has elapsed before the countdown (cd_start) in the first contention window CW_start 1106 has reached zero, the wireless device 202 can proceed to block 1312.

Subsequently, at block 1312, after T_start 1201 elapses before the countdown (cd_start) in the first contention window CW_start 1106 has reached zero, the wireless device 202 begins a countdown (cd_randomized_start) starting from Cnt_randomized_start. For example, the wireless device 202 can wait until the busy medium 1202 is free, as discussed above with respect to FIG. 12. The device 202 can begin the CSMA countdown (cd_randomized_start), starting from Cnt_randomized_start 1210 after detecting the medium to be free for the DIFS 1204. Accordingly, the device 202 can begin the CSMA countdown (cd_randomized_start) at the beginning of the second contention window (CW_randomized_start) 1206.

Next, at block 1314, the wireless device 202 transmits the prepared frame when the earliest of either countdown (cd_start or cd_randomized_start) ends. For example, the wireless device 202 can transmit the frame 500 (FIG. 5) when cd_start reaches zero, if cd_start reaches zero before cd_randomized_start. On the other hand, the wireless device 202 can transmit the frame 500 when cd_randomized_start reaches zero, if cd_randomized_start reaches zero before cd_start. Accordingly, the wireless device 202 can contend for transmission of a prepared frame using the increased efficiency of the randomized-start contention window 1206 (FIG. 12), but without waiting longer than the static-start contention window 1106 (FIG. 11)

In an embodiment, the method shown in FIG. 13 can be implemented in a wireless device that can include a determining circuit, a countdown circuit, and a transmitting circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine the first and second contention windows, determine first and second backoff counts, and/or determine whether a first countdown ends before the beginning of the second contention window. The determining circuit can be configured to perform at least one of blocks 1302, 1304, and 1308 of FIG. 13. The determining circuit can include one or more of the processor 204 (FIG. 2) and the memory 206 (FIG. 2). In some implementations, means for determining can include the determining circuit.

The countdown circuit can be configured to begin and/or maintain a CSMA countdown. The countdown circuit can be configured to perform at least one of blocks 1306 and 1312 of FIG. 13. The countdown circuit can include one or more of the processor 204 (FIG. 2), the memory 206 (FIG. 2), the transmitter 210 (FIG. 2), the receiver 212 (FIG. 2), the antenna 216 (FIG. 2), and the transceiver 214 (FIG. 2). In some implementations, means for beginning a countdown can include the determining circuit.

The transmitting circuit can be configured to selectively transmit a prepared frame. The transmitting circuit can be configured to perform at least one of blocks 1310 and 1314 of FIG. 13. The transmitting circuit can include one or more of the transmitter 210 (FIG. 2), the antenna 216 (FIG. 2), and the transceiver 214 (FIG. 2). In some implementations, means for transmitting can include the transmitting circuit.

In some embodiments, there may be a large number of STAs 106 in a NAN. Accordingly, in some embodiments, a given DW 402 (FIG. 4) may not be long enough to accommodate every STA 106 attempting to transmit. In some cases, excessive contention for the wireless medium can decrease network performance. In some embodiments, STAs 106 can be configured to defer for a random or pseudorandom number of DWs 402 (FIG. 4) before attempting to transmit a discovery frame.

Figure 14:
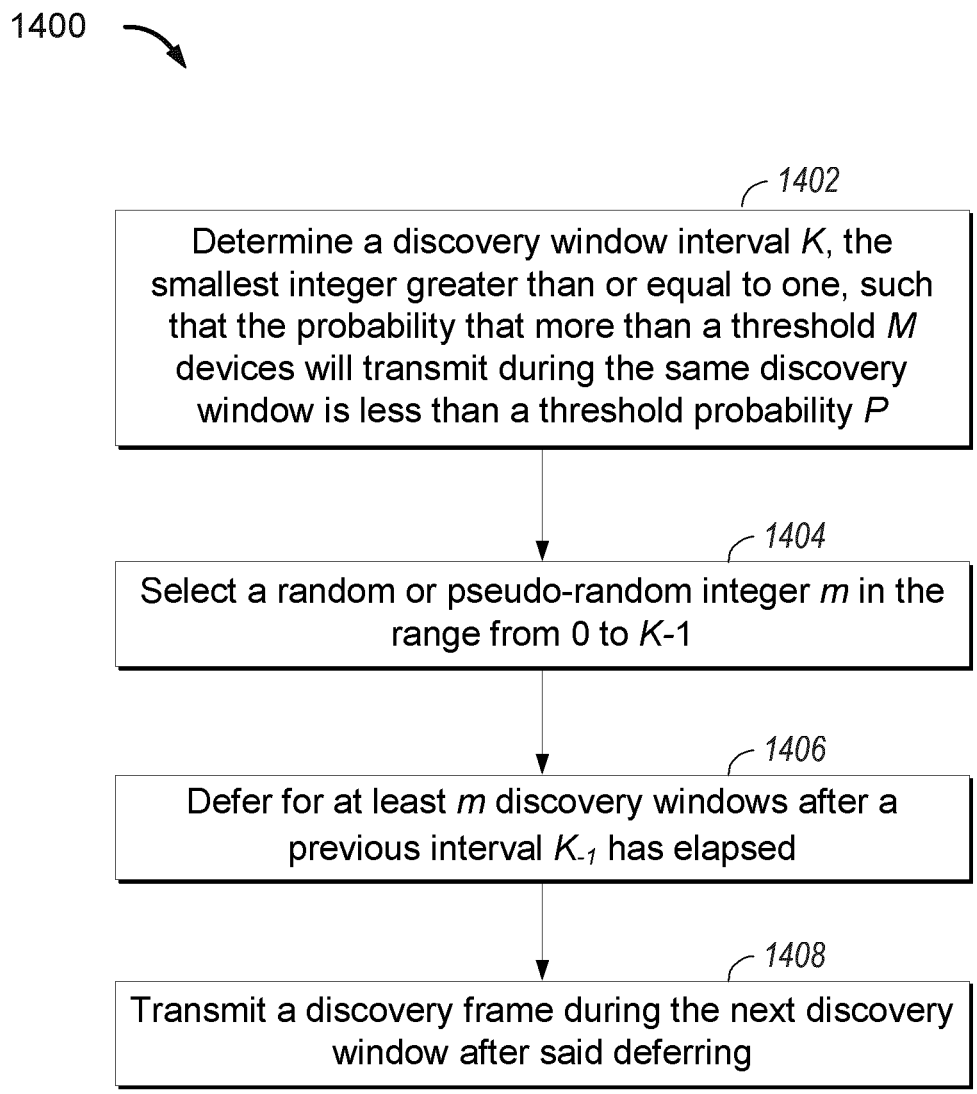
FIG. 14 shows a flowchart of another method of transmitting a prepared frame in accordance with an embodiment.

FIG. 14 shows a flowchart 1400 of another method of transmitting a prepared frame in accordance with an embodiment. In various embodiments, the prepared frame can be a discovery frame such as the frame 500 (FIG. 5). The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1402, the device 202 can determine a discovery window interval K, which can be the smallest integer greater than or equal to one, such that the probability that more than a threshold M devices will transmit during the same discovery window is less than a threshold probability P. In an embodiment, for example, a DW 402 (FIG. 4) may only be long enough to accommodate M discovery frame transmissions. In another embodiment, the NAN can be sized for M devices.

In an embodiment, the value of K may be adapted during operation. For example, the value of K may be adapted according to the number of STAs in the network, and/or the number of STAs detected by the device 202. For example, the value of K can be reduced as the number of STAs in the neighborhood of the transmitting device 202 increases. In one embodiment, the device 202 can choose K based on a number of devices N associated with the NAN according to Equation 1, below.

$$\mathrm{erfc}\left\{\frac{M-N/K}{\sqrt{2N(1/K)(1-1/K)}}\right\} < P \quad (1)$$

As shown in Equation 1, above, the device 202 can choose K such that the number of devices that contend is greater than a target maximum number of contending devices M with no more than a threshold probability P. In various embodiments, M can be between around 1 and around 10, such as, for example, 1. In some embodiments, M can be determined as a percentage of N such as, for example, 1%, 5%, or 10%. In various embodiments, P can be between around 0.05 and around 0.15, such as, for example, 0.1. Thus, the device 202 can determine the lowest K that satisfies Equation 1, where erfc is the complementary error function.

Next, at block 1404, the device 202 selects a random or pseudo-random integer m in the range from 0 to K−1. In various embodiments, the device 202 can select m based on a random or pseudorandom uniform distribution function. In some embodiments, a non-uniform distribution function can be used.

Then, at block 1406, the device 202 defers for at least m discovery windows after a previous interval K−1 has elapsed. In other words, each time the device 202 chooses an interval K, it can contend for transmission during an $m^{th}$ discovery window 402 (FIG. 4) within that interval. After transmission, it can effectively wait until the end of the original interval K, and then determine a new m within the next interval K.

In an embodiment, for example, the device 202 can determine an adjustment b according to Equation 2, where $m_{-1}$ is an integer m computed for the previous transmission, and c is the number of discovery windows that have elapsed since the previous transmission. The device 202 can defer for b+m discovery windows before contending for the next discovery frame. Accordingly, the device 202 can wait for a remaining portion of the last interval K to elapse before deferring an additional m discovery windows.

$$b = \max(0, (K - m_{-1} - c)) \quad (1)$$

Thereafter, at block 1408, the device 202 transmits a discovery frame during the next discovery window after deferring. For example, the device 202 can contend for transmission after deferring for the random or pseudorandom number of discovery windows m plus any remaining portion of the last interval K.

In an embodiment, the method shown in FIG. 14 can be implemented in a wireless device that can include a determining circuit, a selecting circuit, a deferring circuit, and a transmitting circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine the discovery window interval K. The determining circuit can be configured to perform at least block 1402 of FIG. 14. The determining circuit can include one or more of the processor 204 (FIG. 2) and the memory 206 (FIG. 2). In some implementations, means for determining can include the determining circuit.

The selecting circuit can be configured to select the random or pseudorandom integer m. The selecting circuit can be configured to perform at least block 1404 of FIG. 14. The selecting circuit can include one or more of the processor 204 (FIG. 2) and the memory 206 (FIG. 2). In some implementations, means for selecting can include the selecting circuit.

The deferring circuit can be configured to defer for at least m discovery windows. The deferring circuit can be configured to perform at least block 1406 of FIG. 14. The deferring circuit can include one or more of the processor 204 (FIG. 2) and the memory 206 (FIG. 2). In some implementations, means for deferring can include the deferring circuit.

The transmitting circuit can be configured to transmit the discovery frame. The transmitting circuit can be configured to perform at least block 1408 of FIG. 14. The transmitting circuit can include one or more of the transmitter 210 (FIG. 2), the antenna 216 (FIG. 2), and the transceiver 214 (FIG. 2). In some implementations, means for transmitting can include the transmitting circuit.

Figure 15:
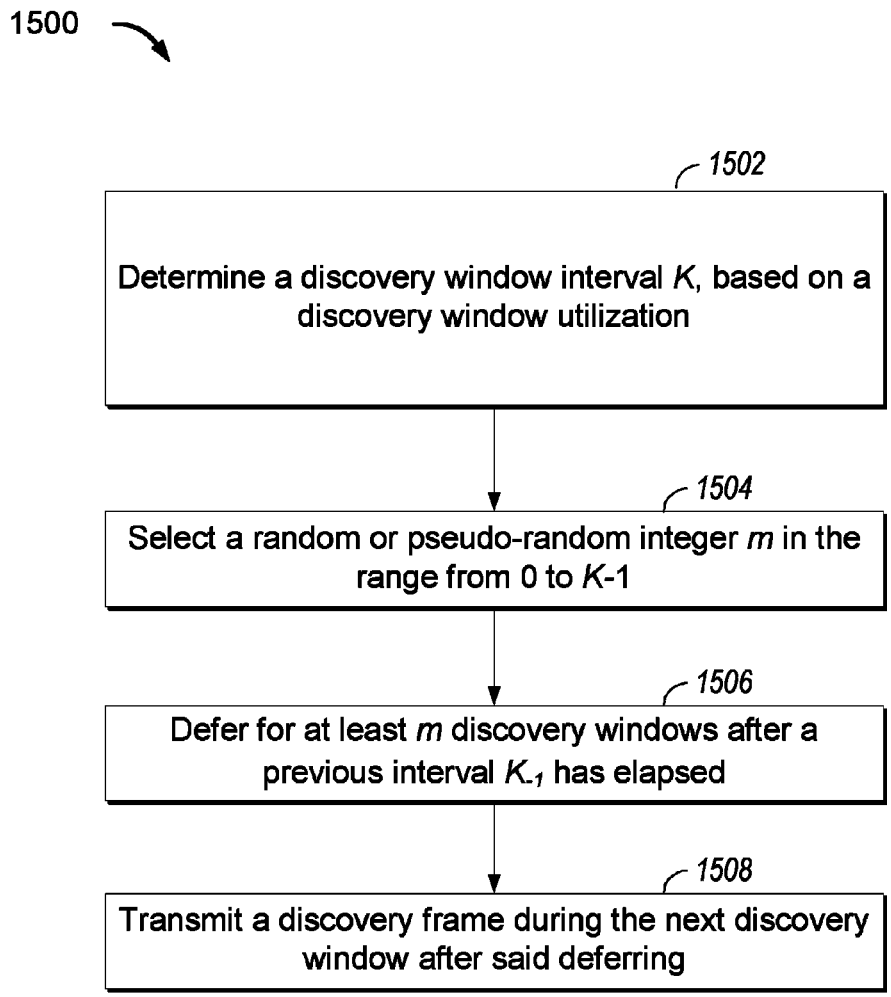
FIG. 15 shows a flowchart of another method of transmitting a prepared frame in accordance with an embodiment.

FIG. 15 shows a flowchart 1500 of another method of transmitting a prepared frame in accordance with an embodiment. In various embodiments, the prepared frame can be a discovery frame such as the frame 500 (FIG. 5). The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1502, the device 202 can determine a discovery window interval K, based on a discovery window utilization. In various embodiments, utilization can include a number of transmission slots used out of a number available, an amount of transmission time used out of a transmission time available, etc. For example, a DW 402 (FIG. 4) may only be long enough to accommodate M discovery frame transmissions. Each STA 106 can determine a number of transmissions in the discovery window as a percentage of M.

In some embodiments, determining the discovery window interval K can include determining a transmission end time for a discovery window, comparing the transmission end time to a threshold time smaller than a size of the discovery window, increasing K when the transmission end time is greater than or equal to the threshold time, and decreasing K when the transmission end time is less than the threshold time. For example, the device 202 can monitor traffic during the DW 402 (FIG. 4) and determine a time T_End at which transmissions cease, at which the wireless medium goes idle, etc. The device 202 can compare the time T_End to a threshold T_Threshold, which can be less than a duration T_DW of the discovery window. In various embodiments, the threshold T_Threshold can be preset, stored in memory, dynamically determined, etc.

When the transmission end time T_End is greater than or equal to the threshold T_Threshold, the discovery window can be determined to have a high utilization. Accordingly, the device 202 can increase K, thereby deferring for more discovery windows and decreasing discovery window utilization. In an embodiment, increasing K includes setting K to the minimum of: a maximum K, and a previous K plus a constant. In other words, K(x)=min(K_max, K(x)+gamma). In an embodiment, increasing K includes setting K to the minimum of: a maximum K, and a previous K times a constant greater than one. In other words, K(x)=min(K_max, K(x)*beta) for (beta>1).

In an embodiment, decreasing K includes setting K to the maximum of: a minimum K, and a previous K minus a constant. In other words, K(x)=max(K_min, K(x)−delta). In an embodiment, decreasing K includes setting K to the maximum of: a minimum K, and a previous K times a constant less than one. In other words, K(x)=max(K_min, K(x)/alpha) for (alpha>1).

In various embodiments, the device 202 can update K every discovery window, every discovery window during which the device 202 has data to transmit, periodically, intermittently, etc.

Next, at block 1504, the device 202 selects a random or pseudo-random integer m in the range from 0 to K−1. In various embodiments, the device 202 can select m based on a random or pseudorandom uniform distribution function. In some embodiments, a non-uniform distribution function can be used.

Then, at block 1506, the device 202 defers for at least m discovery windows after a previous interval K−1 has elapsed. In other words, each time the device 202 chooses an interval K, it can contend for transmission during an $m^{th}$ discovery window 402 (FIG. 4) within that interval. After transmission, it can effectively wait until the end of the original interval K, and then determine a new m within the next interval K.

In an embodiment, for example, the device 202 can determine an adjustment b according to Equation 2, where $m_{-1}$ is an integer m computed for the previous transmission, and c is the number of discovery windows that have elapsed since the previous transmission. The device 202 can defer for b+m discovery windows before contending for the next discovery frame. Accordingly, the device 202 can wait for a remaining portion of the last interval K to elapse before deferring an additional m discovery windows.

$$b=\max(0,(K-m_{-1}-c)) \quad (1)$$

Thereafter, at block 1508, the device 202 transmits a discovery frame during the next discovery window after deferring. For example, the device 202 can contend for transmission after deferring for the random or pseudorandom number of discovery windows m plus any remaining portion of the last interval K.

In an embodiment, the method shown in FIG. 15 can be implemented in a wireless device that can include a determining circuit, a selecting circuit, a deferring circuit, and a transmitting circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine the discovery window interval K. The determining circuit can be configured to perform at least block 1502 of FIG. 15. The determining circuit can include one or more of the processor 204 (FIG. 2) and the memory 206 (FIG. 2). In some implementations, means for determining can include the determining circuit.

The selecting circuit can be configured to select the random or pseudorandom integer m. The selecting circuit can be configured to perform at least block 1504 of FIG. 15. The selecting circuit can include one or more of the processor 204 (FIG. 2) and the memory 206 (FIG. 2). In some implementations, means for selecting can include the selecting circuit.

The deferring circuit can be configured to defer for at least m discovery windows. The deferring circuit can be configured to perform at least block 1506 of FIG. 15. The deferring circuit can include one or more of the processor 204 (FIG. 2) and the memory 206 (FIG. 2). In some implementations, means for deferring can include the deferring circuit.

The transmitting circuit can be configured to transmit the discovery frame. The transmitting circuit can be configured to perform at least block 1508 of FIG. 15. The transmitting circuit can include one or more of the transmitter 210 (FIG. 2), the antenna 216 (FIG. 2), and the transceiver 214 (FIG. 2). In some implementations, means for transmitting can include the transmitting circuit.

It should be understood that any reference to any combination of terms using a designation such as "A, B, and/or C" can be used herein to refer to any combination of those terms. For example "A and/or B" can indicate "one or more of A, B, and C" and "at least one of A, B, and C." Thus, "A, B, and/or C" can include A alone, B alone, C alone, both A and B, both B and C, both A and C, and all A, B, and C.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communicating via a wireless medium by a wireless communications apparatus within a network, the method comprising:
determining first and second contention windows, the first contention window beginning earlier than the second contention window;
beginning a first carrier sense multiple access (CSMA) countdown at the start of the first contention window;
beginning a second CSMA countdown when the first CSMA countdown does not end before the start of the second contention window; and
transmitting a prepared frame at a time of the first CSMA countdown ending or the second CSMA countdown ending, whichever is earlier.

2. The method of claim 1, further comprising replacing, at the beginning of the second contention window, the first CSMA countdown with the minimum of a remaining value of the first CSMA countdown and a value of the second CSMA count down.

3. The method of claim 1, further comprising transmitting one or more additional frames after transmitting the prepared frame, and limiting the one or more additional frames based on at least one of: a maximum number of frames and a maximum transmission time.

4. The method of claim 1, wherein the start of the second contention window is randomly or pseudo-randomly selected based on a uniform distribution within an entire discovery window.

5. The method of claim 1, wherein the start of the second contention window is randomly or pseudo-randomly selected based on a uniform distribution within a remaining portion of a discovery window.

6. The method of claim 1, further comprising determining a random start time, within a discovery window, for the second contention window.

7. The method of claim 1, further comprising transmitting the prepared frame when the first CSMA countdown ends before the start of the second contention window.

8. The method of claim 1, further comprising:
determining a first random backoff count less than a size of the first contention window; and
determining a second random backoff count less than a size of the second contention window.

9. The method of claim 1, wherein the first contention window is larger than the second contention window.

10. The method of claim 1, wherein a size of the first contention window, in slots, is a least five times a number of devices in the network.

11. The method of claim 1, wherein a size of the second contention window is 15 slots.

12. The method of claim 1, wherein a size of the second contention window is 31 slots.

13. The method of claim 1, wherein the network comprises a neighborhood-aware-network.

14. The method of claim 1, wherein the prepared frame comprises a discovery frame or a beacon frame.

15. A wireless communications apparatus configured to communicate within a network via a wireless medium, the apparatus comprising:
a processor configured to:
determine first and second contention windows, the first contention window beginning earlier than the second contention window;
begin a first carrier sense multiple access (CSMA) countdown at the start of the first contention window; and
begin a second CSMA countdown when the first CSMA countdown does not end before the start of the second contention window; and
a transmitter configured to transmit a prepared frame at a time of the first CSMA countdown ending or the second CSMA countdown ending, whichever is earlier.

16. The apparatus of claim 15, wherein the processor is further configured to, at the beginning of the second contention window, replace the first CSMA countdown with the minimum of a remaining value of the first CSMA countdown and a value of the second CSMA count down.

17. The apparatus of claim 15, wherein the transmitter is further configured to transmit one or more additional frames after transmitting the prepared frame, and the processor is further configured to limit the one or more additional frames based on at least one of: a maximum number of frames and a maximum transmission time.

18. The apparatus of claim 15, wherein the start of the second contention window is randomly or pseudo-randomly selected based on a uniform distribution within an entire discovery window.

19. The apparatus of claim 15, wherein the start of the second contention window is randomly or pseudo-randomly selected based on a uniform distribution within a remaining portion of a discovery window.

20. The apparatus of claim 15, wherein the processor is further configured to determine a random start time, within a discovery window, for the second contention window.

21. The apparatus of claim 15, wherein the transmitter is further configured to transmit the prepared frame when the first CSMA countdown ends before the start of the second contention window.

22. The apparatus of claim 15, wherein the processor is further configured to:
determine a first random backoff count less than a size of the first contention window; and
determine a second random backoff count less than a size of the second contention window.

23. The apparatus of claim 15, wherein the first contention window is larger than the second contention window.

24. The apparatus of claim 15, wherein a size of the first contention window, in slots, is a least five times a number of devices in the network.

25. The apparatus of claim 15, wherein a size of the second contention window is 15 slots.

26. The apparatus of claim 15, wherein a size of the second contention window is 31 slots.

27. The apparatus of claim 15, wherein the network comprises a neighborhood-aware-network.

28. The apparatus of claim 15, wherein the prepared frame comprises a discovery frame or a beacon frame.

29. An apparatus for communicating within a network via a wireless medium, the apparatus comprising:

means for determining first and second contention windows, the first contention window beginning earlier than the second contention window;

means for beginning a first carrier sense multiple access (CSMA) countdown at the start of the first contention window;

means for beginning a second CSMA countdown when the first CSMA countdown does not end before the start of the second contention window; and means for transmitting a prepared frame at a time of the first CSMA countdown ending or the second CSMA countdown ending, whichever is earlier.

30. The apparatus of claim 29, further comprising means for replacing, at the beginning of the second contention window, the first CSMA countdown with the minimum of a remaining value of the first CSMA countdown and a value of the second CSMA count down.

31. The apparatus of claim 29, further comprising means for transmitting one or more additional frames after transmitting the prepared frame, and means for limiting the one or more additional frames based on at least one of: a maximum number of frames and a maximum transmission time.

32. The apparatus of claim 29, wherein the start of the second contention window is randomly or pseudo-randomly selected based on a uniform distribution within an entire discovery window.

33. The apparatus of claim 29, wherein the start of the second contention window is randomly or pseudo-randomly selected based on a uniform distribution within a remaining portion of a discovery window.

34. The apparatus of claim 29, further comprising means for determining a random start time, within a discovery window, for the second contention window.

35. The apparatus of claim 29, further comprising means for transmitting the prepared frame when the first CSMA countdown ends before the start of the second contention window.

36. The apparatus of claim 29, further comprising:
means for determining a first random backoff count less than a size of the first contention window; and
means for determining a second random backoff count less than a size of The second contention window.

37. The apparatus of claim 29, wherein the first contention window is larger than the second contention window.

38. The apparatus of claim 29, wherein a size of the first contention window, in slots, is a least five times a number of devices in the network.

39. The apparatus of claim 29, wherein a size of the second contention window is 15 slots.

40. The apparatus of claim 29, wherein a size of the second contention window is 31 slots.

41. The apparatus of claim 29, wherein the network comprises a neighborhood-aware-network.

42. The apparatus of claim 29, wherein the prepared frame comprises a discovery frame or a beacon frame.

43. A non-transitory computer-readable medium comprising code that, when executed, causes a wireless communications apparatus within a network to:

determine first and second contention windows, the first contention window beginning earlier than the second contention window;

begin a first carrier sense multiple access (CSMA) countdown at the start of the first contention window;

begin a second CSMA countdown when the first CSMA countdown does not end before the start of the second contention window; and transmit a prepared frame at a time of the first CSMA countdown ending or the second CSMA countdown ending, whichever is earlier.

44. The he medium of claim 43, further comprising code that, when executed, causes the apparatus to replace, at the beginning of the second contention window, the first CSMA countdown with the minimum of a remaining value of the first CSMA countdown and a value of the second CSMA count down.

45. The medium of claim 43, further comprising code that, when executed, causes the apparatus to transmit one or more additional frames after transmitting the prepared frame, and limit the one or more additional frames based on at least one of: a maximum number of frames and a maximum transmission time.

46. The medium of claim 43, wherein the start of the second contention window is randomly or pseudo-randomly selected based on a uniform distribution within an entire discovery window.

47. The medium of claim 43, wherein the start of the second contention window is randomly or pseudo-randomly selected based on a uniform distribution within a remaining portion of a discovery window.

48. The medium of claim 43, further comprising code that, when executed, causes the apparatus to determine a random start time, within a discovery window, for the second contention window.

49. The medium of claim 43, further comprising code that, when executed, causes the apparatus to transmit the prepared frame when the first CSMA countdown ends before the start of the second contention window.

50. The medium of claim 43, further comprising code that, when executed, causes the apparatus to:
determine a first random backoff count less than a size of the first contention window; and
determine a second random backoff count less than a size of te second contention window.

51. The medium of claim 43, wherein the first contention window is larger than the second contention window.

52. The medium of claim 43, wherein a size of the first contention window, in slots, is a least five times a number of devices in the network.

53. The medium of claim 43, wherein a size of the second contention window is 15 slots.

54. The medium of claim 43, wherein a size of the second contention window is 31 slots.

55. The medium of claim 43, wherein the network comprises a neighborhood-aware-network.

56. The medium of claim 43, wherein the prepared frame comprises a discovery frame or a beacon frame.

* * * * *